(12) United States Patent
Nagasaka

(10) Patent No.: US 10,607,607 B2
(45) Date of Patent: Mar. 31, 2020

(54) CONTROL DEVICE, DISPLAY DEVICE, METHOD, AND PROGRAM

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 15/771,825

(22) PCT Filed: Oct. 4, 2016

(86) PCT No.: PCT/JP2016/079517
§ 371 (c)(1),
(2) Date: Apr. 27, 2018

(87) PCT Pub. No.: WO2017/119164
PCT Pub. Date: Jul. 13, 2017

(65) Prior Publication Data
US 2018/0308477 A1    Oct. 25, 2018

(30) Foreign Application Priority Data

Jan. 7, 2016  (JP) ................................ 2016-001670

(51) Int. Cl.
*G01L 21/00* (2006.01)
*G10L 15/22* (2006.01)
(Continued)

(52) U.S. Cl.
CPC ............ *G10L 15/22* (2013.01); *G06F 3/0484* (2013.01); *G06F 3/167* (2013.01); *G08C 17/02* (2013.01);
(Continued)

(58) Field of Classification Search
CPC ....................................................... G10L 21/00
(Continued)

(56) References Cited

U.S. PATENT DOCUMENTS 6,697,782 B1 * 2/2004 Iso-Sipila ............... G10L 15/08
704/275
8,375,081 B2 * 2/2013 Feliberti ............... G06Q 10/109
709/203

(Continued)

FOREIGN PATENT DOCUMENTS

| JP | H11-120647 A | 4/1999 |
| JP | 2000-232694 A | 8/2000 |
| JP | 2010-276283 A | 12/2010 |

OTHER PUBLICATIONS

Dec. 7, 2018, European Search Report issued for related EP Application No. 16883665.8.

*Primary Examiner* — Michael C Colucci
(74) *Attorney, Agent, or Firm* — Paratus Law Group, PLLC

(57) ABSTRACT

There is provided a control device to improve convenience for a user by resolving or alleviating a disadvantage of a known voice interaction, the control device including: a device control unit configured to control one or more controlled devices; a voice notification unit configured to output user-oriented voice notification regarding at least the one controlled device; and a display control unit configured to cause a display device to display a message corresponding to the voice notification output by the voice notification unit.

18 Claims, 32 Drawing Sheets

(51) Int. Cl.
*H04Q 9/00* (2006.01)
*G08C 17/02* (2006.01)
*G06F 3/0484* (2013.01)
*G06F 3/16* (2006.01)

(52) U.S. Cl.
CPC ........... *H04Q 9/00* (2013.01); *G08C 2201/30* (2013.01); *G08C 2201/51* (2013.01)

(58) Field of Classification Search
USPC ....... 704/500, 208, 231, 235, 251, 260, 275; 340/407.1, 686.1; 715/716, 734, 764, 767
See application file for complete search history.

(56) References Cited

U.S. PATENT DOCUMENTS

| | | | | |
|---|---|---|---|---|
| 8,452,602 | B1* | 5/2013 | Bringert | G06F 3/167 704/251 |
| 8,521,857 | B2* | 8/2013 | Maxwell | G06F 3/147 709/203 |
| 9,922,034 | B2* | 3/2018 | Bastide | G06F 16/122 |
| 10,129,720 | B1* | 11/2018 | Bouzid | G06F 3/0482 |
| 2002/0193989 | A1* | 12/2002 | Geilhufe | G10L 15/26 704/208 |
| 2005/0049850 | A1* | 3/2005 | Porter | G04G 11/00 704/1 |
| 2006/0085195 | A1* | 4/2006 | Nishizaki | G06F 3/16 704/260 |
| 2007/0280439 | A1* | 12/2007 | Prywes | H04M 11/10 379/88.18 |
| 2010/0115548 | A1* | 5/2010 | Leyvi | G09B 5/06 725/34 |
| 2011/0055256 | A1* | 3/2011 | Phillips | G10L 15/30 707/769 |
| 2011/0084818 | A1* | 4/2011 | Graham | H04M 1/663 340/407.1 |
| 2011/0173553 | A1* | 7/2011 | Karmon | G06Q 10/107 715/767 |
| 2013/0031478 | A1* | 1/2013 | Strober | G06F 9/452 715/716 |
| 2013/0111377 | A1* | 5/2013 | Newman | G06F 3/048 715/764 |
| 2013/0132081 | A1* | 5/2013 | Ryu | G01L 21/06 704/235 |
| 2013/0289983 | A1* | 10/2013 | Park | G10L 15/26 704/235 |
| 2015/0006166 | A1* | 1/2015 | Schmidt | G10L 15/30 704/231 |
| 2015/0010167 | A1* | 1/2015 | Arling | H04N 21/42226 381/105 |
| 2015/0088518 | A1* | 3/2015 | Kim | G06F 3/167 704/251 |
| 2015/0106104 | A1 | 4/2015 | Son et al. | |
| 2015/0154976 | A1* | 6/2015 | Mutagi | H04L 12/281 704/275 |
| 2015/0187197 | A1* | 7/2015 | Golomb | G08B 21/0205 340/686.1 |
| 2015/0309673 | A1* | 10/2015 | Brandley | G06F 16/41 715/716 |
| 2015/0348548 | A1* | 12/2015 | Piernot | G10L 15/26 704/235 |
| 2016/0095083 | A1* | 3/2016 | Park | H04M 1/72597 455/458 |
| 2016/0124590 | A1* | 5/2016 | Li | H04L 12/2809 715/734 |

\* cited by examiner

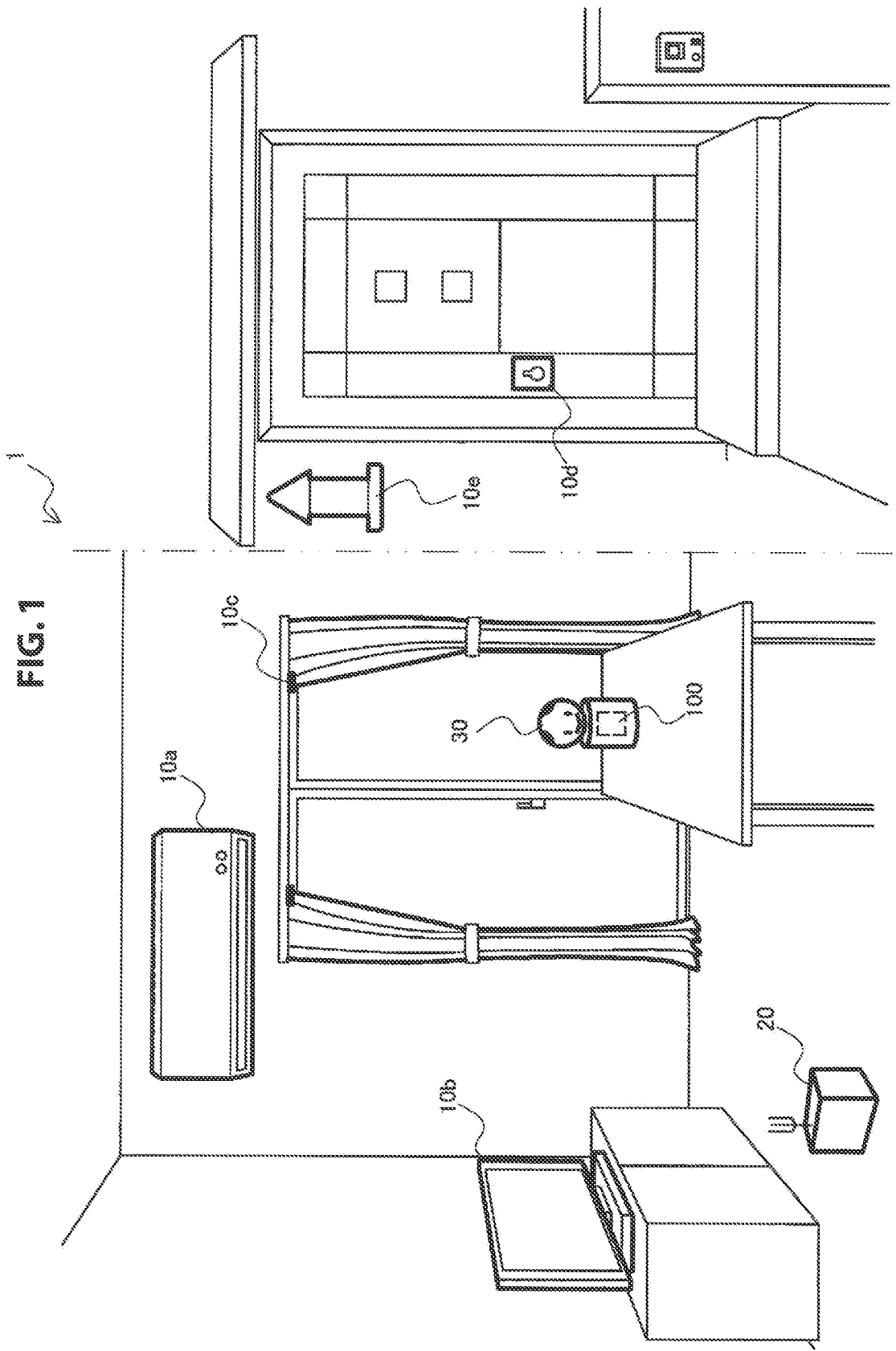

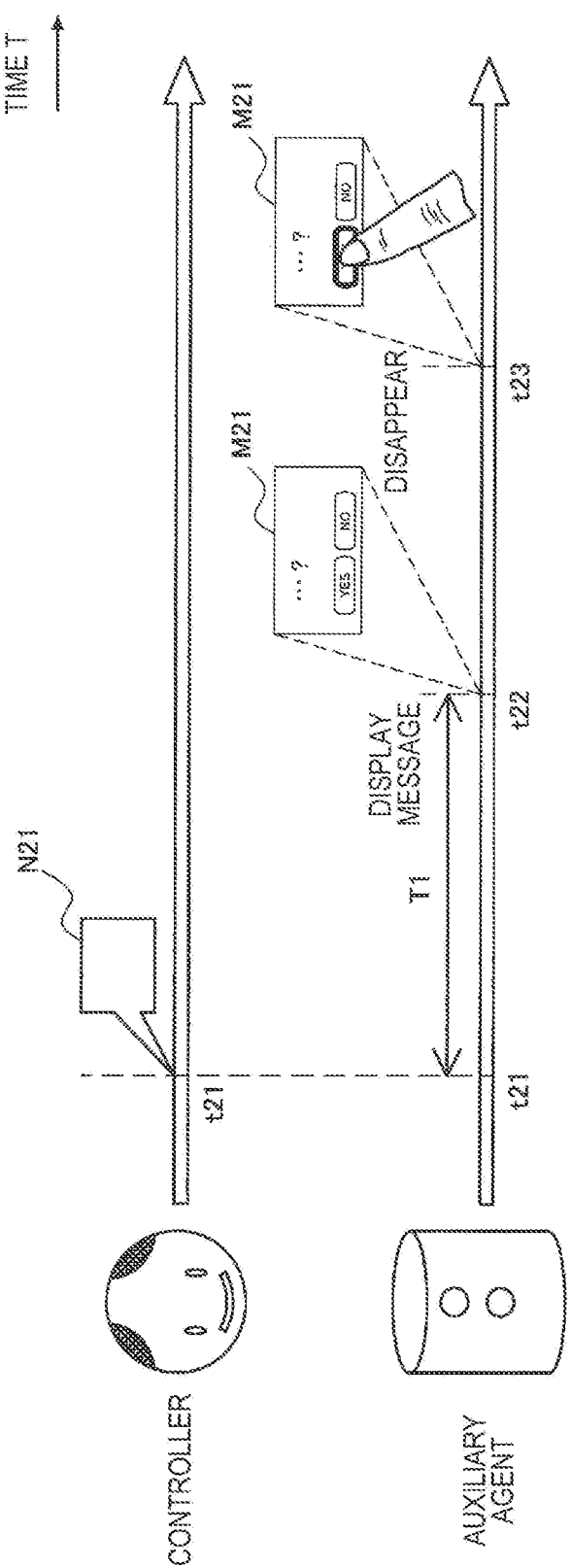

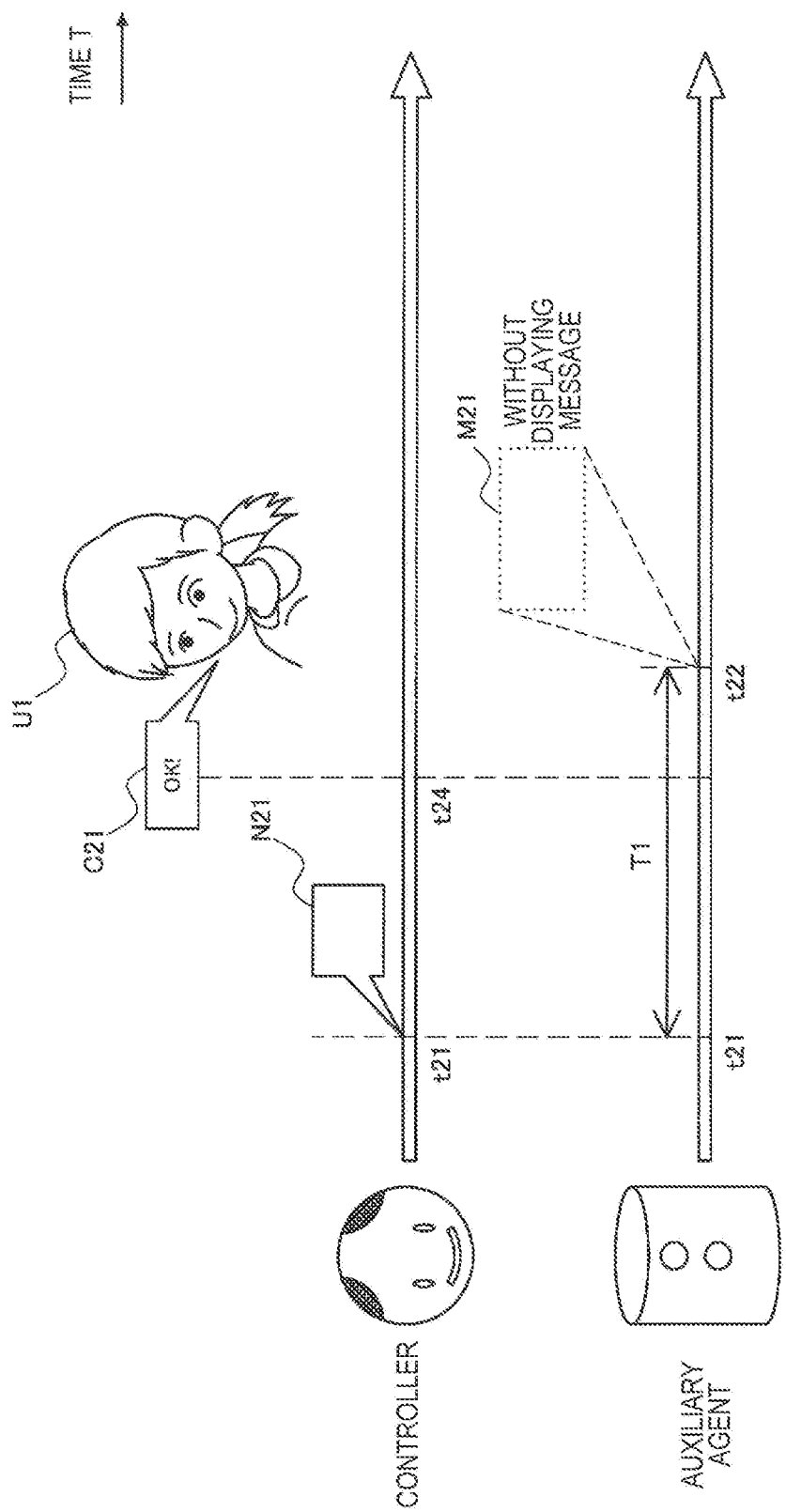

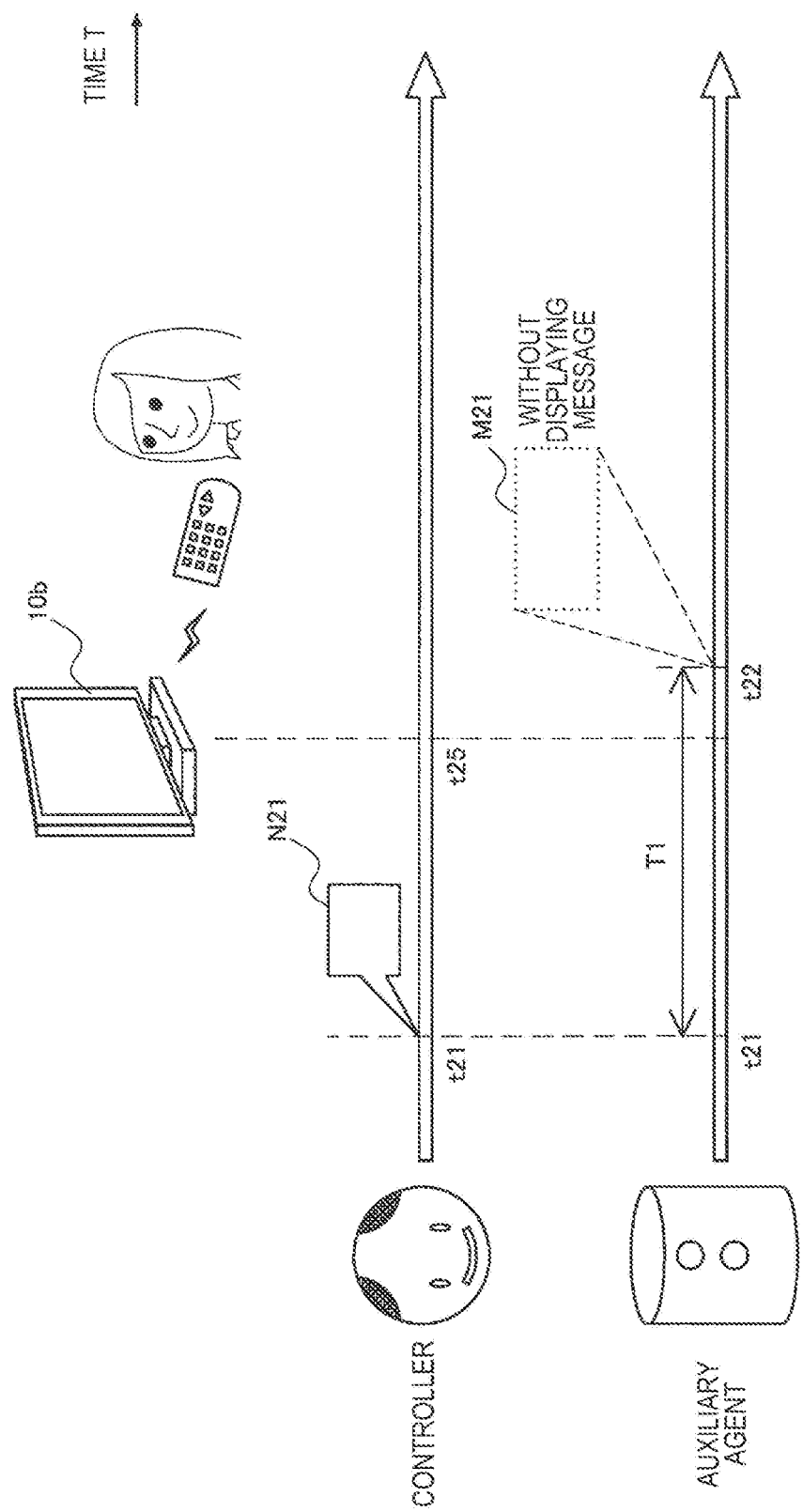

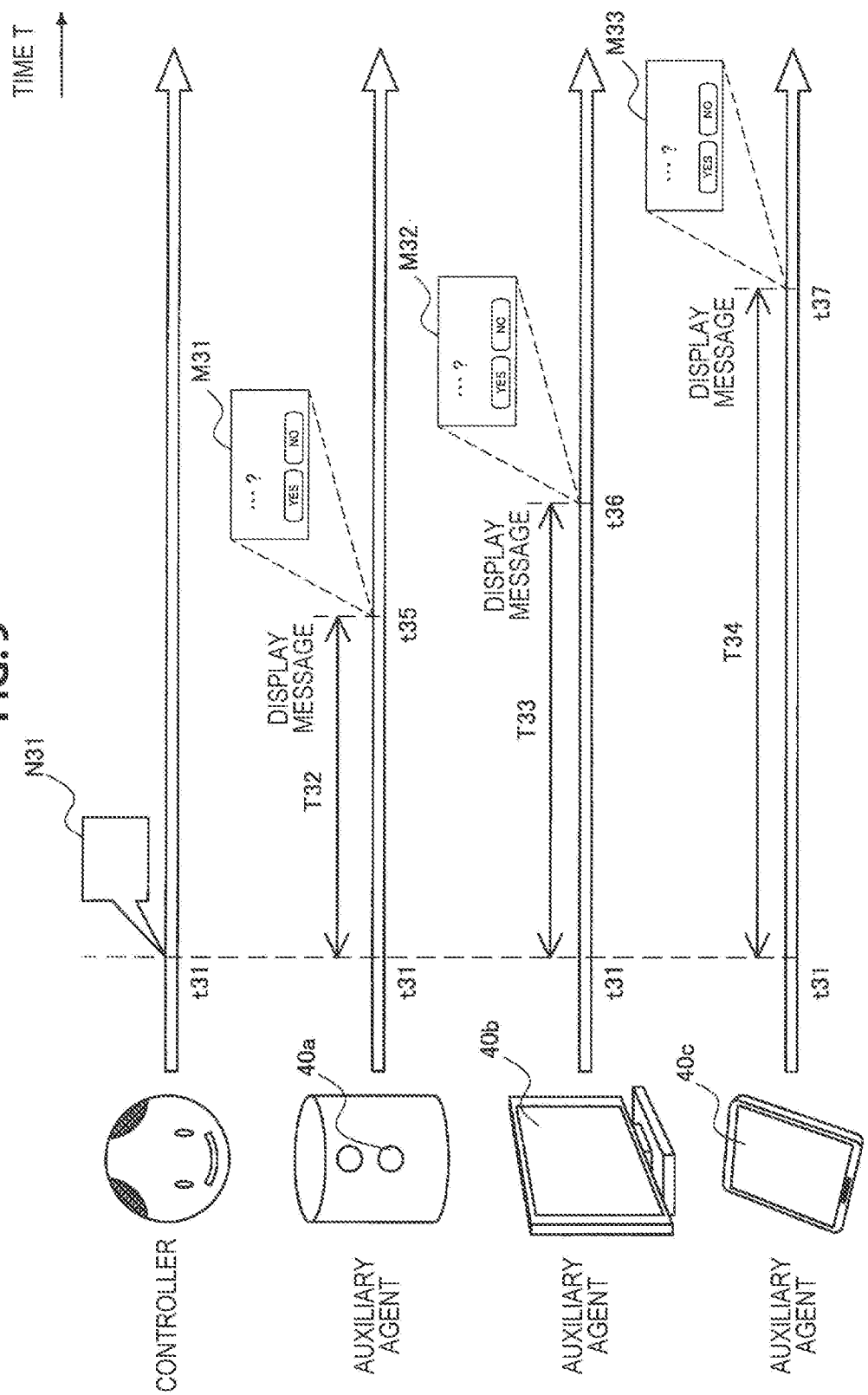

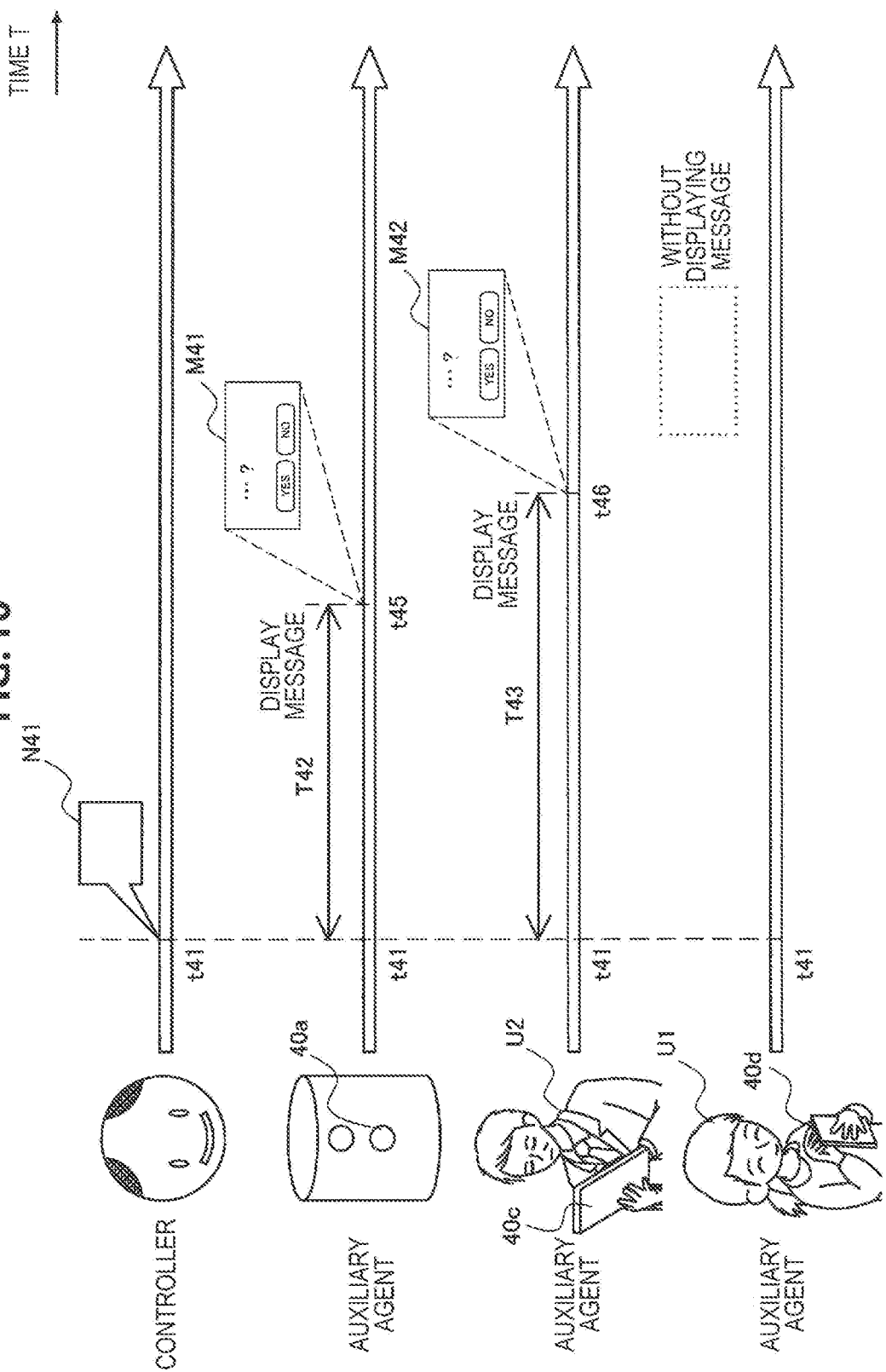

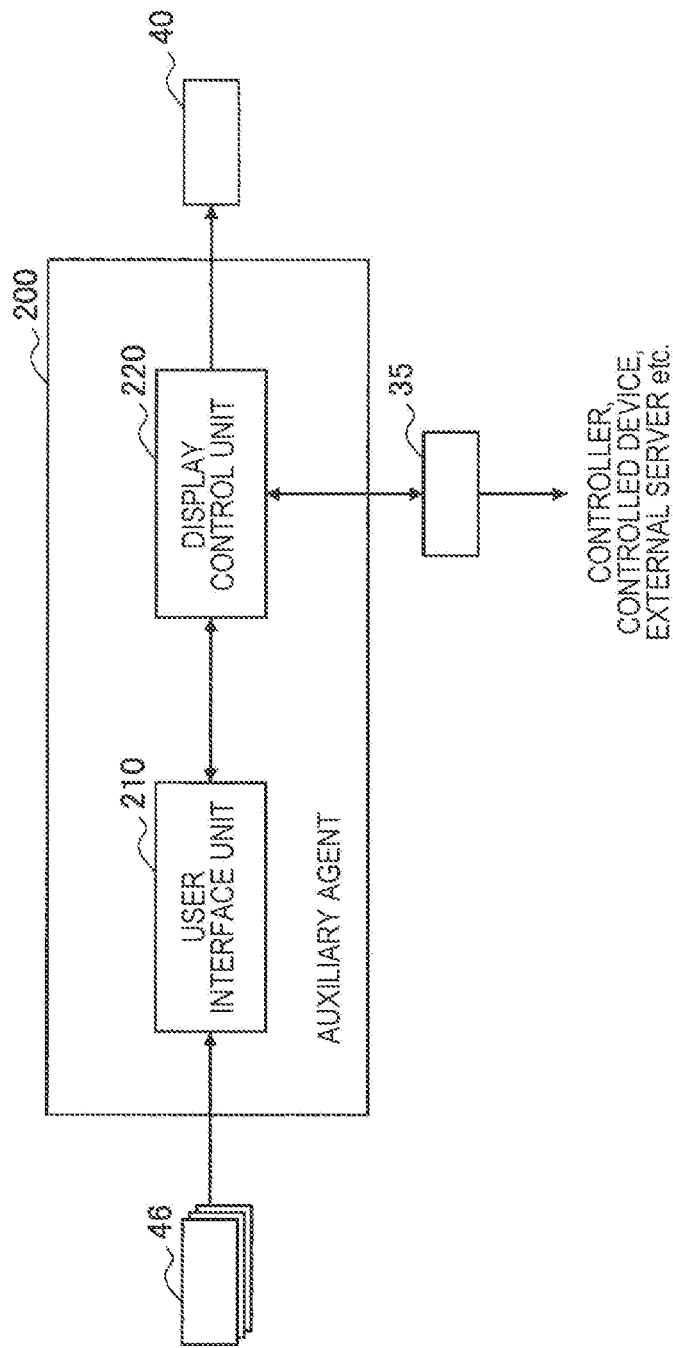

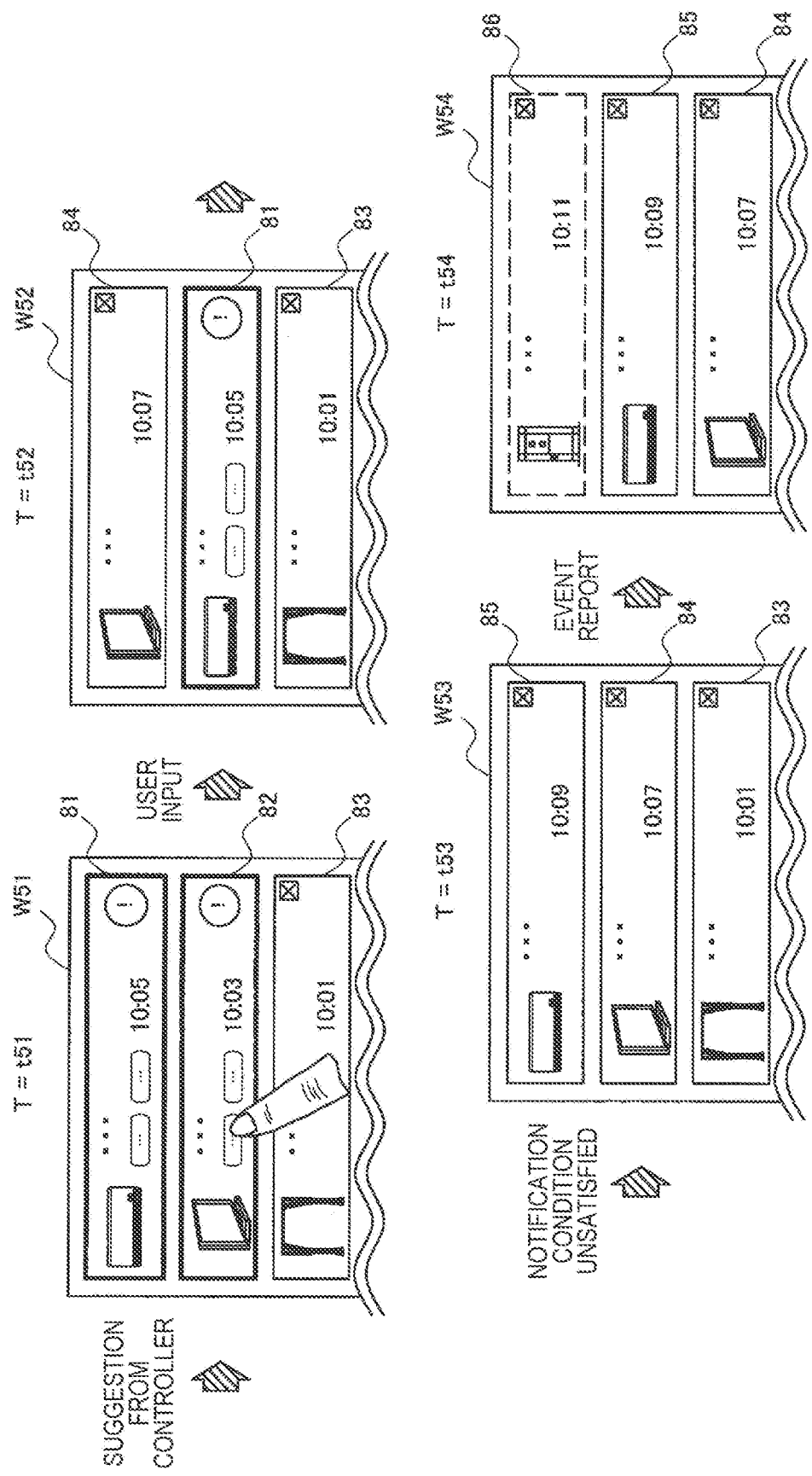

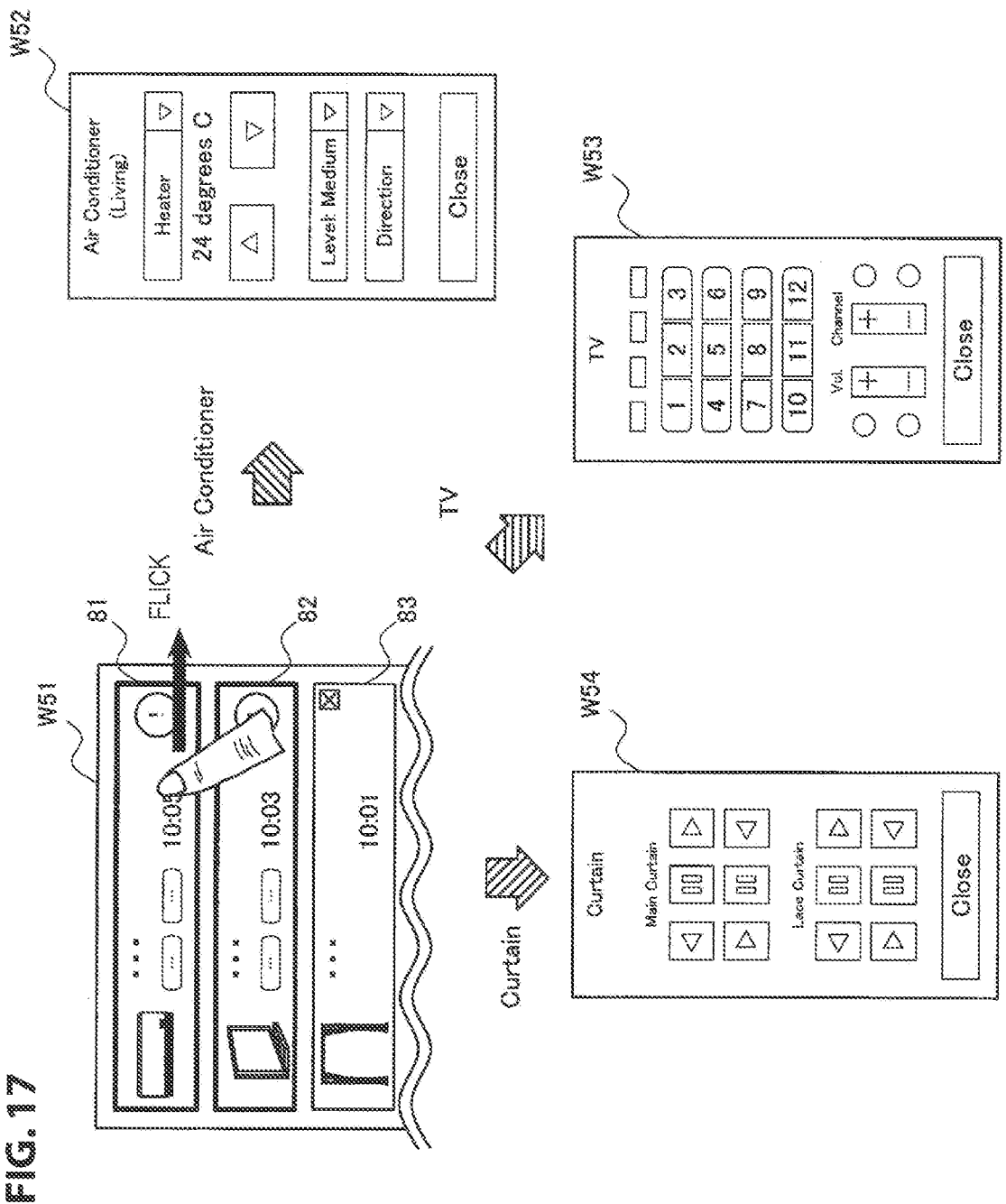

CONTROL DEVICE, DISPLAY DEVICE, METHOD, AND PROGRAM

CROSS REFERENCE TO PRIOR APPLICATION

This application is a National Stage Patent Application of PCT International Patent Application No. PCT/JP2016/079517 (filed on Oct. 4, 2016) under 35 U.S.C. § 371, which claims priority to Japanese Patent Application No. 2016-001670 (filed on Jan. 7, 2016), which are all hereby incorporated by reference in their entirety.

TECHNICAL FIELD

The present disclosure relates to a control device, a display device, a method, and a program.

BACKGROUND ART

In the related art, technologies for utilizing voice for user interfaces in remote controllers controlling controlled devices in environments are known. For example, Patent Literature 1 discloses a technology for recognizing a voice command as a user input. Patent Literature 2 discloses a technology for outputting voice guidance for a manipulation by a user.

CITATION LIST

Patent Literature

Patent Literature 1: JP 11-120647A
Patent Literature 2: JP 2001-338213A

DISCLOSURE OF INVENTION

Technical Problem

With advances in information processing technologies, interactions between machines and users have been further improved and diversified. However, there is still room for improvement in known voice interaction structures in view of reliability, timeliness, or selectivity of information delivery.

Solution to Problem

According to the present disclosure, there is provided a control device including: a device control unit configured to control one or more controlled devices; a voice notification unit configured to output user-oriented voice notification regarding at least the one controlled device; and a display control unit configured to cause a display device to display a message corresponding to the voice notification output by the voice notification unit.

In addition, according to the present disclosure, there is provided a display device to be connected to a control device controlling one or more controlled devices and outputting user-oriented voice notification regarding at least the one controlled device, the display device including: a display control unit configured to cause a display unit to display a message corresponding to the voice notification output by the control device in accordance with an instruction received from the control device.

In addition, according to the present disclosure, there is provided a control method performed by a control device controlling one or more controlled devices, the method including: outputting user-oriented voice notification regarding at least the one controlled device; and causing a display device to display a message corresponding to the output voice notification.

In addition, according to the present disclosure, there is provided a display control method performed by a display device connected to a control device controlling one or more controlled devices and outputting user-oriented voice notification regarding at least the one controlled device, the method including: causing a display unit to display a message corresponding to the voice notification output by the control device in accordance with an instruction received from the control device.

In addition, according to the present disclosure, there is provided a program causing a processor of a control device to function as: a device control unit configured to control one or more controlled devices; a voice notification unit configured to output user-oriented voice notification regarding at least the one controlled device; and a display control unit configured to cause a display device to display a message corresponding to the voice notification output by the voice notification unit.

In addition, according to the present disclosure, there is provided a program causing a processor of a display device connected to a control device controlling one or more controlled devices and outputting user-oriented voice notification regarding at least the one controlled device, to function as: a display control unit configured to cause a display unit to display a message corresponding to the voice notification output by the control device in accordance with an instruction received from the control device.

Advantageous Effects of Invention

According to the technology of the present disclosure, it is possible to further improve convenience for a user by mixing a voice interaction and a visual interaction in a preferred form. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating an example of an environment in which an interaction system according to the present disclosure can be used.

FIG. 6 is an explanatory diagram illustrating a first scenario for display of a message corresponding to the voice notification.

FIG. 7 is an explanatory diagram illustrating a second scenario for display of a message corresponding to the voice notification.

FIG. 8 is an explanatory diagram illustrating a third scenario for display of a message corresponding to the voice notification.

FIG. 9 is an explanatory diagram illustrating a fourth scenario for display of a message corresponding to the voice notification.

FIG. 10 is an explanatory diagram illustrating a fifth scenario for display of a message corresponding to the voice notification.

FIG. 11 is a block diagram illustrating an example of a configuration of a logical function of an auxiliary agent according to an embodiment.

FIG. 16 is an explanatory diagram illustrating an example of a chronological change in the display of the message window.

FIG. 17 is an explanatory diagram illustrating an example of transition from a message window to a remote control window.

MODE(S) FOR CARRYING OUT THE INVENTION

Figure 2A:
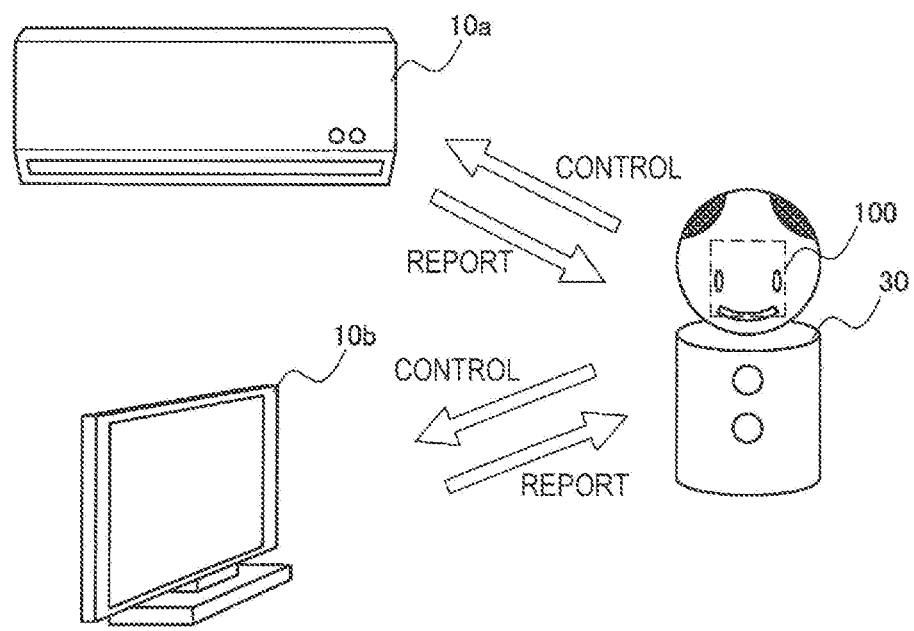
FIG. 2A is an explanatory diagram illustrating a first example of a relation between a controller and controlled devices.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Overview of system
1-1. Example of assumed environment
1-2. Controller
1-3. Several problems
1-4. Introduction of auxiliary agent
2. Configuration example of controller
3. Configuration example of auxiliary agent
4. Flow of processes
4-1. Process of controlled device
4-2. Process of controller
4-3. Process of auxiliary agent
5. Cooperation with external server
6. Conclusion

1. OVERVIEW OF SYSTEM

[1-1. Example of Assumed Environment]

FIG. 1 is an explanatory diagram illustrating an example of an environment in which an interaction system according to the present disclosure can be used. Referring to the left half of FIG. 1, an environment 1 includes, for example, a living room of a home in which a user lives. In the living room, there are controlled devices 10a, 10b, and 10c. The controlled device 10a is an air conditioner that adjusts an indoor temperature of the living room. The controlled device 10b is a television device that includes a display to display content of television broadcast. The controlled device 10c is a curtain 10c that has an automatic opening and closing function. Referring to the right half of FIG. 1, controlled devices 10d and 10e installed outside of the home are further included in the environment 1. The controlled device 10d is a smart lock that manages locking and unlocking of a door. The controlled device 10e is an exterior lamp that emits illumination light. Note that the controlled devices are not limited to the examples of FIG. 1. In the environment 1, there may be any kind of controlled device. In the following description, in a case in which it is not necessary to distinguish the controlled devices 10a to 10e from each other, the controlled devices 10a to 10e are collectively referred to as the controlled devices 10 by omitting the letters suffixed to the reference numerals. The meaning of the omission of the letters suffixed to the reference numerals applies to other constituent elements.

An interaction system according to the present disclosure is used in such an environment in which there are one or more controlled devices 10. Although FIG. 1 illustrates the shape of the home in which the user lives as an example of the environment, the interaction system according to the present disclosure may be used in any other environment such as an automobile, another vehicle, an office, a store, an education facility, or a public facility. In addition, one interaction system may be in a plurality of geographically separated environments (for example, a home and an automobile or a home and an office) in an integrated manner Referring to FIG. 1, a communication device 20 and a control device 30 which is an example of a device which can be included in the interaction system are further illustrated. The communication device 20 relays communication between the controlled device 10 and the control device 30. The communication device 20 may be, for example, any type of communication device such as a wireless local area network (LAN) access point, a router, or a LAN switch. In a case in which the control device 30 performs direct communication with the controlled device 10 (for example, via an ad hoc network or via a connection line in a device or between devices), the communication device 20 may not be included.

[1-2. Controller]

The control device 30 has a function of controlling one or more controlled devices 10. In the present specification, a logical function of controlling the controlled device is referred to as a "controller." In the example of FIG. 1, the control device 30 includes a controller 100. For example, the controller 100 controls the air conditioner 10a such that an indoor temperature is adjusted to a temperature appropriate for the user. In addition, the controller 100 controls the television device 10b such that video content desired by the user is displayed, controls the curtain 10b such that desired brightness of the room is realized, controls the smart lock 10d in accordance with a predetermined security rule, and controls ON/OFF or intensity of illumination light of the exterior lamp 10e.

The controlled device 10 periodically reports a status associated with the controlled device 10 to the controller 100 in response to a request from the controller 100 or when a certain trigger condition is satisfied. For example, a status of the air conditioner 10a can include an environment status such as a temperature measured by a temperature sensor and humidity measured by a humidity sensor in addition to an operation status of the device such as a target temperature, a wind volume, and a wind direction. In addition, in a case in which a certain event is detected, the controlled device 10 reports occurrence of the event to the controller 100. For example, the television device 10b may report an approach to a broadcast time of a broadcast program to be recommended to a user as an event. In addition, the smart lock 10d may report locking or unlocking as an event.

The controller 100 may automatically control the controlled device in accordance with a status acquired from the controlled device or a sensor (not illustrated) and/or a control condition stored in advance. In addition, the controller 100 may control the controlled device in accordance with a user input acquired via a user interface. A control signal exchanged between the controller 100 and the controlled device 10 may be transmitted via a wireless channel such as infrared rays, visible rays, or radio waves or may be transmitted via a wired channel.

Figure 2B:
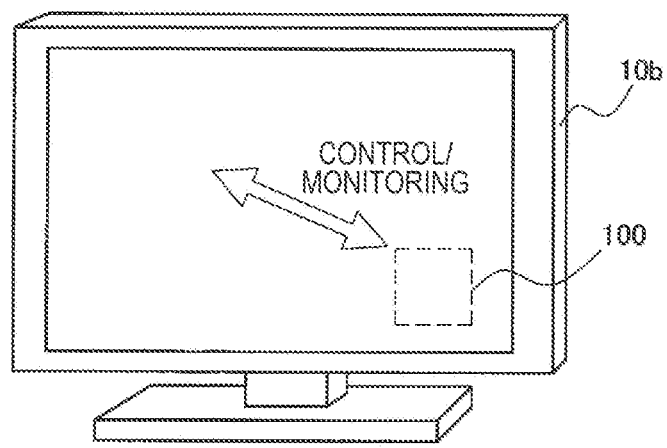
FIG. 2B is an explanatory diagram illustrating a second example of a relation between a controller and controlled devices.
Figure 2C:
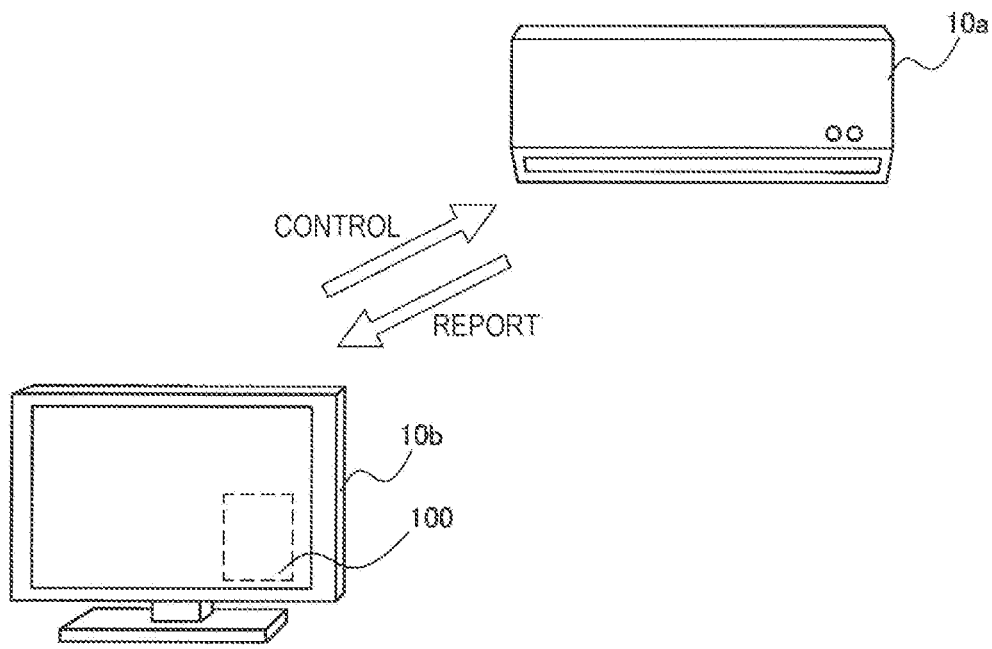
FIG. 2C is an explanatory diagram illustrating a third example of a relation between a controller and controlled devices.

FIGS. 2A to 2C illustrate examples of a relation between the controller and the controlled devices. In a first example illustrated in FIG. 2A, the controller 100 is a module that is mounted on the control device 30 separate from the controlled devices 10a and 10b. The controller 100 controls each of the controlled devices 10a and 10b and receives a status report or an event report from the controlled devices 10a and 10b. In a second example illustrated in FIG. 2B, the controller 100 is mounted as a module that is contained in the controlled device 10b. The controller 100 controls the controlled device 10b and monitors a status associated with the controlled device 10b. In a third example illustrated in FIG. 2C, the controller 100 is mounted as a module that is contained in the controlled device 10b. Further, the controlled device 10b communicates with the controlled device 10a. The controller 100 in the controlled device 10b controls the controlled device 10a and receives a status report or an event report from the controlled device 10a in addition to controlling the controlled device 10b and monitoring the status associated with the controlled device 10b. Note that FIGS. 2A to 2C illustrate the examples in which the controller 100 is mounted as a functional module that operates alone. An example in which functionality of the controller 100 is provided in cooperation with an external module (for example, an external server) will be further described later.

In an embodiment, the controller 100 performs an interaction with a user via a voice interface. Typically, the controller 100 outputs user-oriented voice notification regarding at least one controlled device 10. The user can comprehend a status associated with the controlled device 10, comprehend occurrence of an event, or determine whether control proposed by the controller 100 is approved by hearing the voice notification output from the controller 100. The voice interface has better advantages than other types of user interfaces in that visual attention of the user is not necessary, even a user with low IT skills can easily become familiar with the voice interface, and a pseudo interaction similar to a human interaction through dialogue is enabled. Means for a user input to the controller 100 from the user may also be a voice interface. Instead of or in addition to the voice interface, the means for a user input may also be another type of user interface (for example, a mechanical interface such as a button or a switch, a touch interface, or a gesture interface).

[1-3. Several Problems]

The voice interface can be said to have the above-described good advantages, but also has several problems. First, there is a possibility of a user not being within a range in which voice arrives at the time of output of voice notification. In addition, even if a user is within a range at which voice arrives, the user may fail to hear voice notification or the user may not desire to respond to the voice notification at that time. Second, although repeatedly outputting voice notification of the same content does increase the probability that the content will be delivered to a user, a user who intentionally refrains from responding may be annoyed by the repetition. Third, for example, when much information accumulated while a user is away is output as voice notification, the user may be burdened by the long duration necessary for notification. In addition, only some of the long notification may be content which the user wants to know, but it is difficult for the user to simply select and gain only voice notification desired by the user.

[1-4. Introduction of Auxiliary Agent]

In an embodiment of the technology according to the present disclosure, additional functionality called an "auxiliary agent" in the present specification is introduced to resolve or at least reduce one or more of the above-described problems which can occur when the controller controlling the controlled devices provides a voice interface. The auxiliary agent assists the controller by providing a visual user interface to compensate for inconvenience of the voice interface provided by the controller. Note that the controller has a role of an agent itself in that control of a controlled device is relayed between the user and the controlled device. In addition, as will be described below, the auxiliary agent can also have a function of controlling a controlled device. Accordingly, the terms "controller" and "agent" in the present specification do not limit the technology according to the present disclosure and are used to separately refer to only two types of functionality for convenience.

Typically, the auxiliary agent causes the display device to display a message corresponding to voice notification output by the controller. The auxiliary agent may be mounted on the same device as a controller or may be mounted on another device communicating with the controller via a communication interface.

FIGS. 3A to 3E illustrate examples of disposition of an auxiliary agent. In a first example illustrated in FIG. 3A, both the controller 100 and an auxiliary agent 200 are mounted to be integrated on the control device 30 separate from the controlled devices 10. The auxiliary agent 200 can cause a display device 40a to display a message on a screen. Here, the display device 40a is a projector and the screen is a projection plane on a table.

Figure 3A:
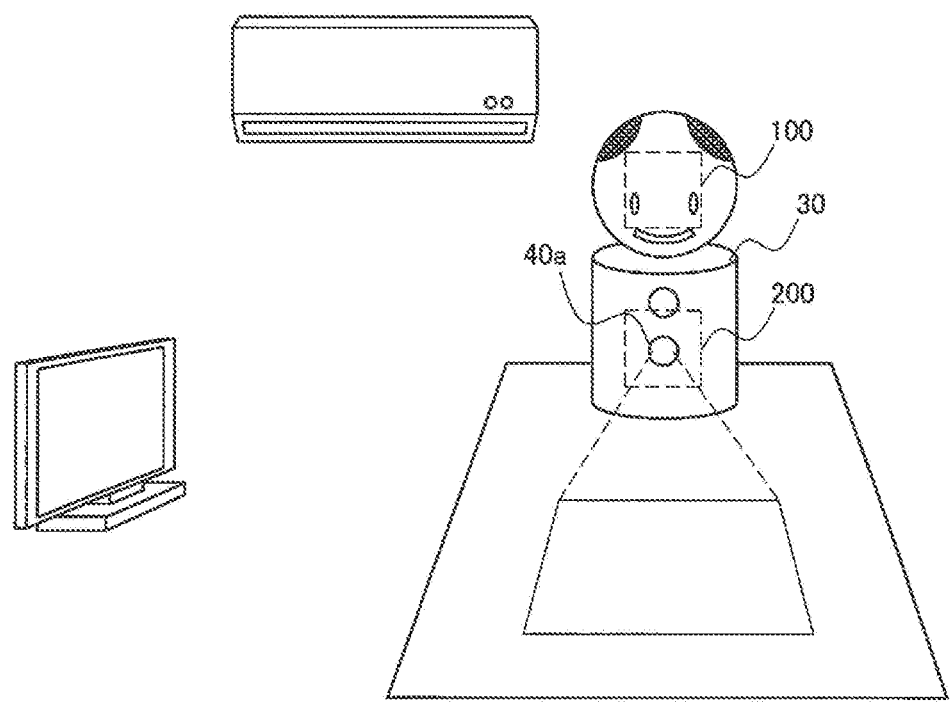
FIG. 3A is an explanatory diagram illustrating a first example of disposition of an auxiliary agent.
Figure 3B:
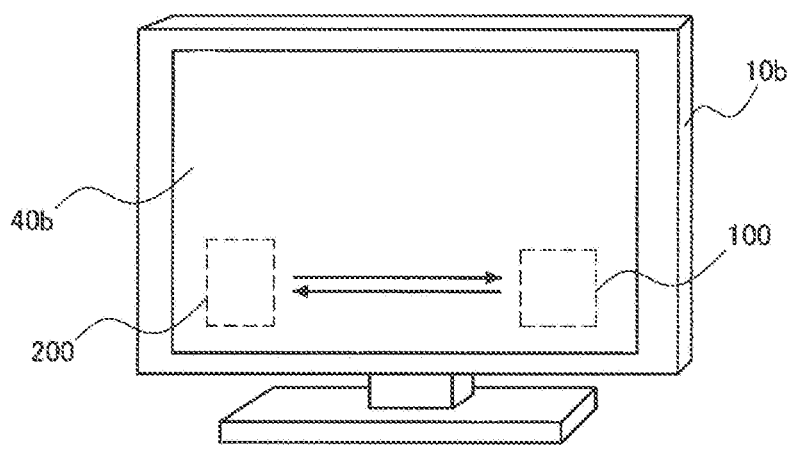
FIG. 3B is an explanatory diagram illustrating a second example of disposition of an auxiliary agent.

In a second example illustrated in FIG. 3B, both the controller 100 and the auxiliary agent 200 are mounted to be integrated on the controlled device 10b. The auxiliary agent 200 can cause the display device 40b to display a message. Here, the display device 40b is equivalent to a display of a television device.

Figure 3C:
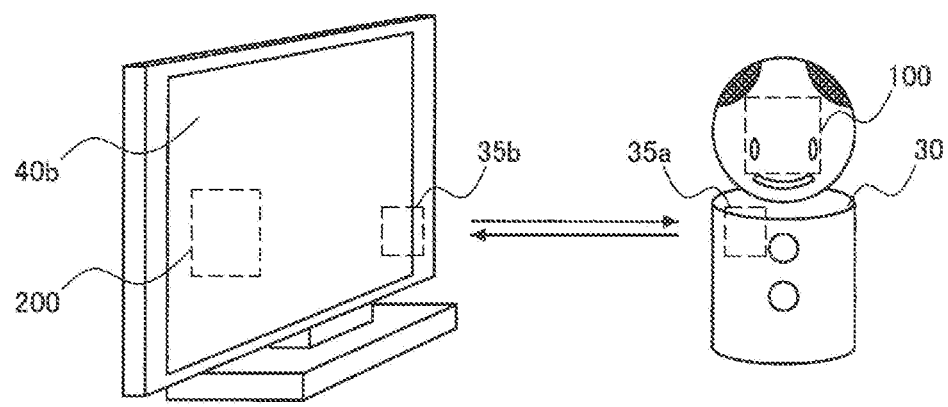
FIG. 3C is an explanatory diagram illustrating a third example of disposition of an auxiliary agent.

In a third example illustrated in FIG. 3C, the auxiliary agent 200 is mounted on the controlled device 10b separate from the control device 30 containing the controller 100, and the control device 30 (the controller 100) and the controlled device 10b (the auxiliary agent 200) communicate with each other via communication interfaces 35a and 35b, respectively. The auxiliary agent 200 can cause the display device 40b to display a message.

Figure 3D:
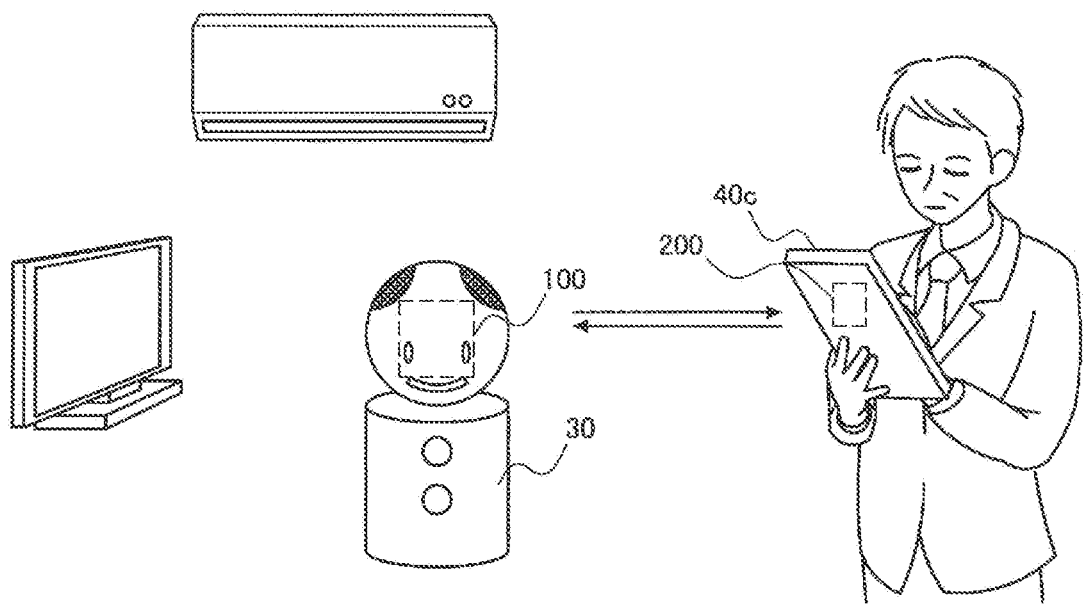
FIG. 3D is an explanatory diagram illustrating a fourth example of disposition of an auxiliary agent.

In a fourth example illustrated in FIG. 3D, the auxiliary agent 200 is mounted on a display terminal 40c which is a device different from the control device 30 (the controller 100) and the controlled device 10. The control device 30 (the controller 100) and the display terminal 40c (the auxiliary agent 20X)) communicate with each other via each communication interface. The auxiliary agent 200 can cause the display terminal 40c to display a message. FIG. 3D illustrates a tablet personal computer (PC) as an example of the display terminal 40c, but a display terminal on which the auxiliary agent can be mounted is not limited to the foregoing example. For example, the auxiliary agent may be mounted on any other type of terminal such as a desktop PC, a laptop PC, a smartphone, a game terminal, a car navigation device, a head-mounted display, or a smartwatch.

Figure 3E:
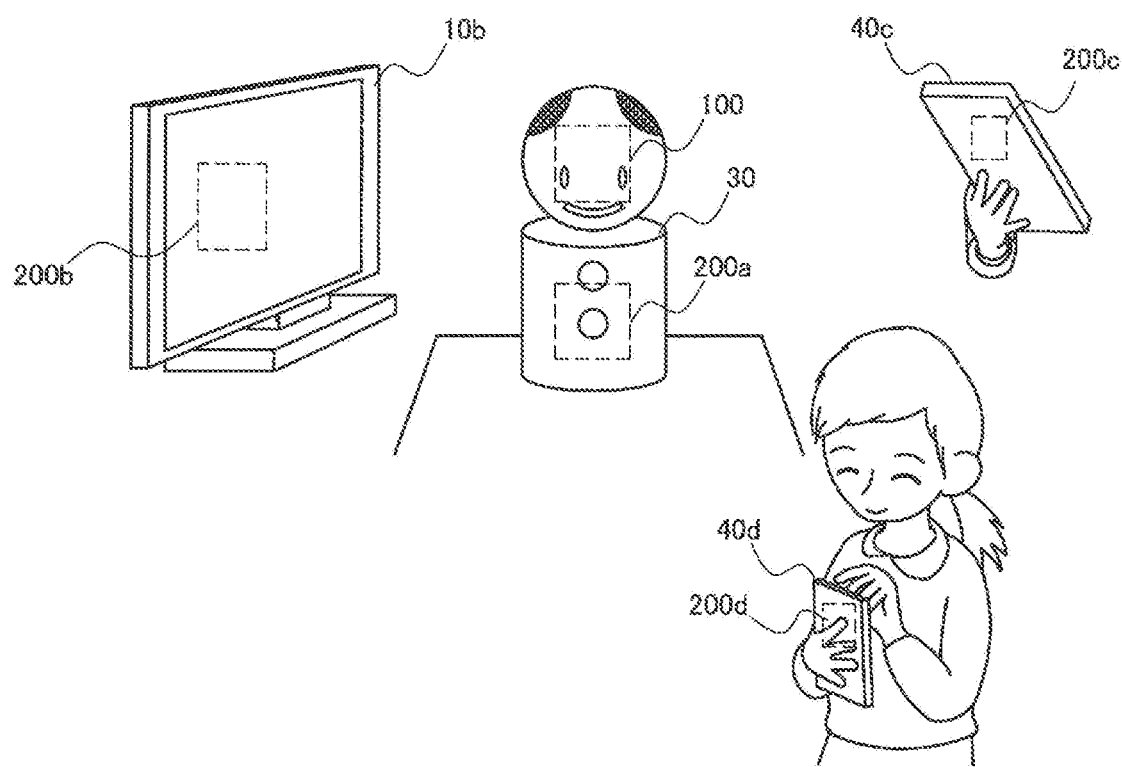
FIG. 3E is an explanatory diagram illustrating a fifth example of disposition of an auxiliary agent.

In a fifth example illustrated in FIG. 3E, there are a plurality of auxiliary agents 200a, 200b, 200c, and 200d. The auxiliary agent 200a is mounted to be integrated with the controller 100 on the control device 30. The auxiliary agent 200b is mounted on the controlled device 10b that is fixedly installed. The auxiliary agent 200c is mounted on the display terminal 40c with mobility. The auxiliary agent 200d is mounted on a display terminal 40d with mobility. Note that, in the present specification, the expression "with mobility" is assumed to include various movement forms such as carrying of a target terminal, mounting on a moving user, or implantation into the body of a moving user. The auxiliary agent may be mounted on an autonomous mobile machine (for example, a robot) that autonomously performs an operation such as walking, running, or flying.

Irrespective of disposition of the auxiliary agent 200, as described above, the auxiliary agent 200 causes the display device to display a message corresponding to at least one user-oriented voice notification in a case in which the user-oriented voice notification is output by the controller 100. Even in a case in which a user is located at a place distant from the controller 100, the user can immediately confirm content of a message if a screen is near the user. In addition, the user can confirm the display content of the message at a desired timing or can respond to the content at a desired timing. In addition, since the auxiliary agent 200 provides a visual user interface as alternative means of the voice interface of the controller 100, the controller 100 may not excessively repeat the voice notification. The visual user interface provided by the auxiliary agent 200 can display much information in various forms. Such a mixture of the voice interaction and the visual interaction can lead to an improvement in reliability, timeliness, or selectivity of information delivery, thereby improving convenience for the user. An example of such a more detailed configuration of the controller 100 and the auxiliary agent 200 will be described in detail in the next section.

2. CONFIGURATION EXAMPLE OF CONTROLLER

Figure 4:
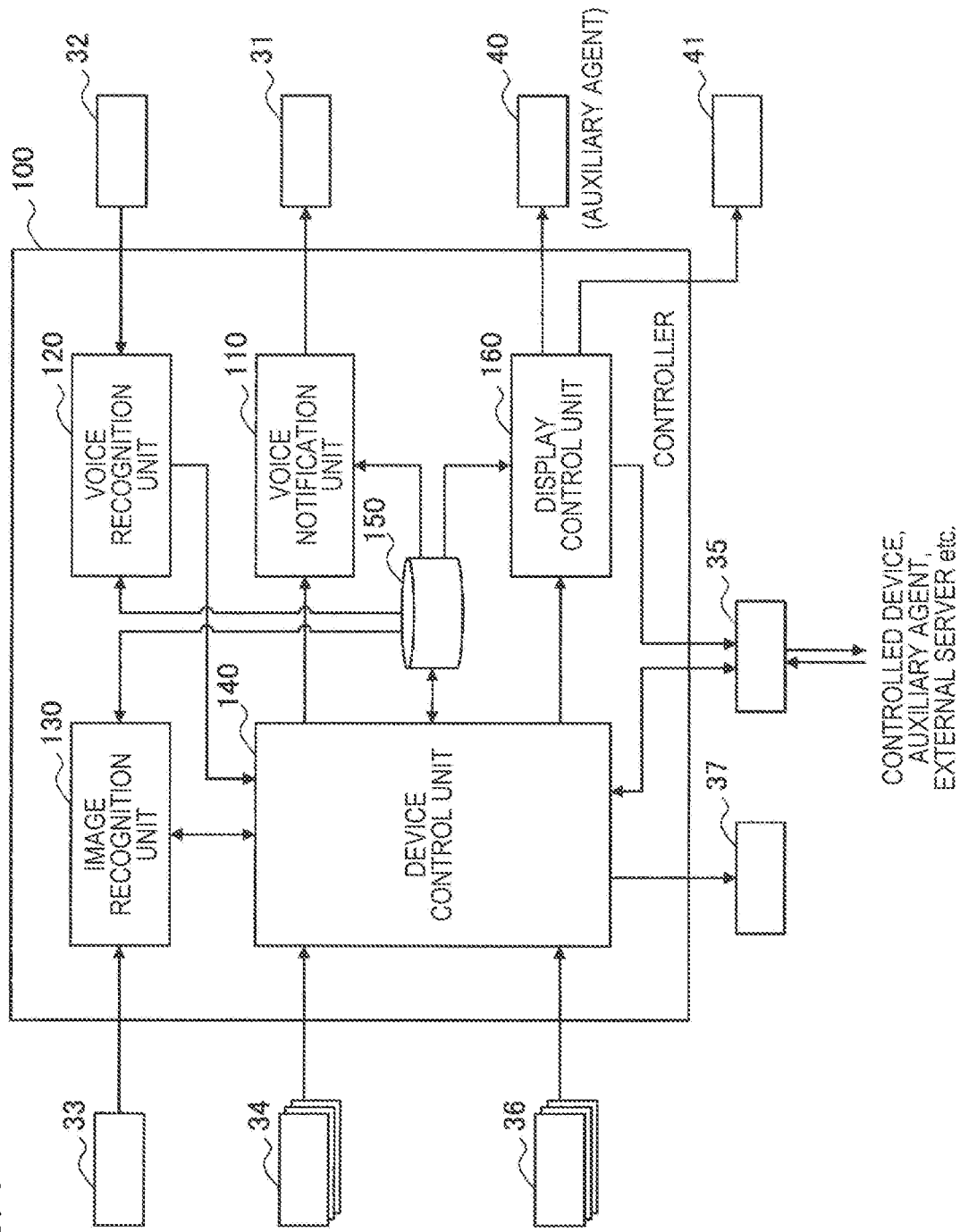
FIG. 4 is a block diagram illustrating an example of a configuration of a logical function of the controller according to an embodiment.

FIG. 4 is a block diagram illustrating an example of a configuration of a logical function of the controller 100 according to an embodiment. The controller 100 includes a voice notification unit 110, a voice recognition unit 120, an image recognition unit 130, a device control unit 140, a storage unit 150, and a display control unit 160. In the example of FIG. 4, the voice notification unit 110 is connected to a speaker 31. The voice recognition unit 120 is connected to a microphone 32. The image recognition unit 130 is connected to a camera 33. The device control unit 140 is connected to one or more sensors 34, the communication interface 35, one or more input interfaces 36, and an infrared interface 37. The display control unit 160 is connected to the communication interface 35, the display device 40, and an announcement device 41. The display device 40 may be, for example, a projector or a monitor. The announcement device 41 may be, for example, a light emitting diode (LED) lamp or a vibrator.

(1) Voice Notification Unit

The voice notification unit 110 and the voice recognition unit 120 have a role of performing voice interaction with a user by the controller 100. Typically, the voice notification unit 110 outputs user-oriented voice notification regarding at least one controlled device 10 controlled by the controller 100 via the speaker 31. For example, the voice notification unit 110 may generate voice notification using an automatic voice synthesis technology on the basis of notification text designated by the device control unit 140. Instead, the voice notification unit 110 may acquire voice data corresponding to a notification number designated by the device control unit 140 or another piece of identification information from the storage unit 150 and may reproduce voice notification from the acquired voice data.

The voice notification output by the voice notification unit 110 may not be said to be necessarily heard and received by a target user. The voice notification unit 110 may repeat the same voice notification a plurality of times. Here, in the embodiment, after the voice notification is output by the voice notification unit 110, a message corresponding to the voice notification is displayed by the auxiliary agent 200. Therefore, the voice notification unit 110 does not repeat the same voice notification the excessive number of times.

In a case in which the voice recognition unit 120 or the image recognition unit 130 to be described below or another human detection sensor detects that there is a user nearby, the voice notification unit 110 may output additional voice notification for prompting the user to see the message (hereinafter referred to as reminding notification) when the auxiliary agent 200 is able to display the message corresponding to the previously output voice notification. Here, the message may be already displayed by the auxiliary agent 200 or may be displayed using any user input as a trigger. In addition, in a case in which the user hearing the reminding notification requests to receive the output voice notification (for example, by a voice command or another user input)

instead of seeing the displayed message, the voice notification unit 110 may output the output voice notification again via the speaker 31.

(2) Voice Recognition Unit

The voice recognition unit 120 recognizes content of a voice input via the microphone 32 using a voice recognition technology. For example, the voice recognition unit 120 recognizes a voice command spoken by the user. The voice command recognized by the voice recognition unit 120 can include a voice command for controlling the controlled device 10. Typically, the voice command for controlling the controlled device 10 is formed by a name for identifying a target device and a keyword associated with control content (for example, "television"+"switch on"). In a case in which the controller 100 proposes specific control for the controlled device 10, a voice command which is a response to the proposal may be formed by only a simple keyword with a meaning of an approval or a refusal. In addition, the voice command recognized by the voice recognition unit 120 may include a voice command directed to the controller 100. For example, the voice recognition unit 120 may recognize a voice command indicating that the user requests to re-output the voice notification. In addition, the voice recognition unit 120 may recognize a voice command indicating that the user explicitly requests that the voice notification is transmitted to the auxiliary agent 200. The voice recognition unit 120 can recognize an individual voice command, for example, by comparing a pattern of the voice command stored in advance by the storage unit 150 with a pattern of input voices.

Further, the voice recognition unit 120 may identify a user speaking a voice by comparing a spectrum obtained by analyzing a voice signal with a voiceprint of the individual user. In addition, the voice recognition unit 120 may merely recognize presence of the user located nearby without identifying an individual user.

(3) Image Recognition Unit

The image recognition unit 130 recognizes a situation of the environment 1 shown in a captured image input from the camera 33 using an image recognition technology. For example, the image recognition unit 130 may identify an individual user by recognizing the face of the user speaking a voice toward the controller 100. In addition, the image recognition unit 130 may merely recognize presence of the user located nearby. In addition, the image recognition unit 130 may recognize a gesture command for controlling the controlled device 10 or a gesture command directed to the controller 100 by reading a gesture acted by the user. The gesture command may be a command corresponding to a motion or a shape of a hand or a finger of the user moved above, for example, a display image projected by a projector. The image recognition unit 130 can identify the user and recognize the presence of the user or recognize the gesture command, for example, by comparing an image feature amount stored in advance by the storage unit 150 with an image feature amount extracted from a captured image.

(4) Device Control Unit

The device control unit 140 controls one or more controlled devices 10. According to a certain embodiment, the device control unit 140 controls the controlled device 10 acted on an environment status input from the sensor 34 so that the environment status satisfies a control target value. The environment status may be received from the controlled device 10 via the communication interface 35. Hereinafter, examples of combinations of environment statuses and kinds of corresponding controlled devices are listed:

an indoor temperature: an air conditioner, a heating device, and a cooling device;

indoor humidity: air conditioner, humidifier, and dehumidifier;

an environment volume: a television device and a media player;

an environment illuminance: an illumination device, and a curtain; and a house dust-amount: an air cleaner.

According to another embodiment, the device control unit 140 decides a control target value or a target operation state of the controlled device 10 from the environment status acquired from the sensor 34 or the controlled device 10 and controls the controlled device 10 so that the decided target value or the target state is achieved. Hereinafter, examples of combinations of the environment status, kinds of corresponding controlled devices, and content of the control are listed:

an indoor temperature: a water heater (water temperature);

environment illuminance: a display (luminance) and a projector (luminance); and a house dust-amount: an autonomous cleaner (level, On/Off. and activity place).

According to still another embodiment, the device control unit 140 controls the controlled device 10 in a case in which a control condition in which a date or a time is dynamically learned or stored in advance in the storage unit 150 is satisfied. Hereinafter, examples of combinations of kinds of controlled devices and content of the control are listed:

a television device: reproduction of a specific channel;

a recorder: recording of images/sounds of contents;

a curtain: opening or closing;

an exterior lamp: On/Off and colors (for example, Christmas colors); and an automobile: starting an engine at time of attendance.

According to still another embodiment, the device control unit 140 controls the controlled device 10 depending on presence of a user determined on the basis of a recognition result input from the voice recognition unit 120 or the image recognition unit 130. Hereinafter, examples of combinations of kinds of presence of a user, kinds of corresponding controlled devices, and content of the control are listed:

a user returning back/going outside: an air conditioner (On/Off);

a user returning back: a water heater (On); and a user absent: a smart lock (security level: high).

Note that such examples do not limit the content of the control to which the technology according to the present disclosure can be applied. The controller 100 may control any kind of controlled device 10 in accordance with any scheme.

The device control unit 140 instructs the voice notification unit 110 to output voice notification to a user on the basis of a report received from the controlled device 10 via the communication interface 35. For example, the device control unit 140 may periodically receive a report of an environment status and/or an operation status from the controlled device 10. In a case in which a predetermined user input (for example, a voice command, a gesture command, or any input from the input interface 36) is detected, the device control unit 140 may request the controlled device 10 to give a status report. When a status report or an event report is received from the controlled device 10, the device control unit 140 causes the voice notification unit 110 to output voice notification for delivering the reported status or event to the user.

The device control unit 140 may output the voice notification from the voice notification unit 110 only in a case in which a predetermined notification condition is satisfied. For example, the notification condition of the voice notification can be associated with one or more of the parameters listed below:

an operation status of a controlled device;
an environment status;
presence of user;
presence of specific user; and
date and/or time.

In the embodiment, a few of the voice notification instructed to be output from the device control unit 140 include content for requesting the user to respond. For example, the device control unit 140 starts controlling the controlled device 10 and requests the user to approve the control operation through voice notification before the control is changed or ends. Then, the device control unit 140 performs the action in a case in which the control operation is approved and does not perform the action in a case in which the control operation is rejected. In addition, the device control unit 140 may propose a control operation predicted to be preferable for the user to the user through voice notification. Content of the control operation preferable for the user may be set by the user and may be stored by the storage unit 150. Instead, a control operation preferable for the user may be learned on the basis of a history of instructions or approvals from the user. The device control unit 140 performs the proposed control operation in a case in which the proposal is approved and does not perform the proposed control operation in a case in which the proposal is rejected.

In a case in which the control operation is approved or a control operation which it is not necessary for the user to approve is started, the device control unit 140 transmits a control signal to the target controlled device 10 via the communication interface 35 or the infrared interface 37. The controlled device 10 operates in accordance with the received control signal. The controlled device 10 may report an operation result to the controller 100.

After the device control unit 140 instructs the voice notification unit 110 to output the voice notification, the device control unit 140 further performs a visual interaction corresponding to the voice notification in cooperation with the display control unit 160. The visual interaction corresponding to the voice notification will be described in detail later.

(5) Storage Unit

The storage unit 150 stores various kinds of data necessary for control of the controlled device 10 by the controller 100 and an interaction with the user. For example, the storage unit 150 stores user information which can include user identification information (an identifier, a nickname, and the like), user attribute information (an age, a sex, a preference, and the like), and setting information according to users (for example, a message selection condition and a display order). In addition, the storage unit 150 stores various kinds of control setting such as a notification condition for the voice notification and a control condition for controlling the controlled device 10. Further, the storage unit 150 may store voice data for the voice notification output by the voice notification unit 110. In addition, the storage unit 150 may store dictionary data for voice recognition by the voice recognition unit 120. In addition, the storage unit 150 may store image feature amount data for image recognition by the image recognition unit 130.

(6) Display Control Unit

The display control unit 160 causes the auxiliary agent 200 to display a message corresponding to the voice notification output by the voice notification unit 110. In the embodiment, the display control unit 160 causes the auxiliary agent 200 to display a message corresponding to the voice notification after a certain time interval elapses from output of the voice notification. An instruction transmitted from the display control unit 160 to the auxiliary agent 200 may include a time stamp indicating a time at which the message is displayed. Instead, the instruction transmitted from the display control unit 160 to the auxiliary agent 200 may include a time stamp indicating a time at which the voice notification is output and information indicating the above-described time interval. In addition, in a case in which the instruction is transmitted after the elapse of the above-described time interval, the time information may not be included in the instruction. The instruction transmitted from the display control unit 160 to the auxiliary agent 200 may include another piece of information such as priority of the message.

Figure 5A:
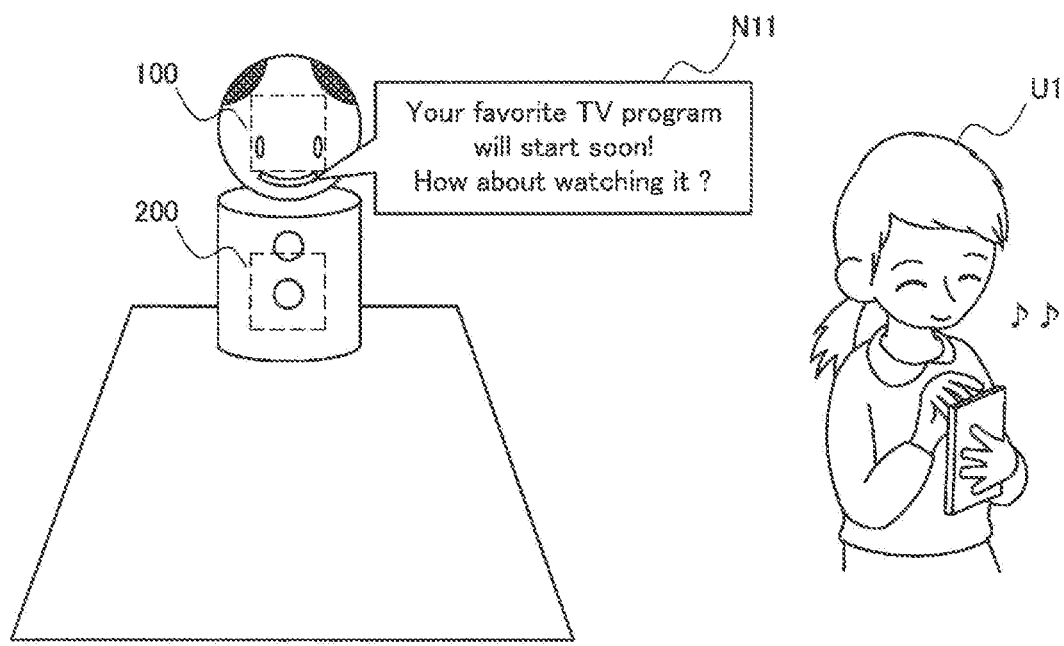
FIG. 5A is an explanatory diagram illustrating an example of voice notification.

FIG. 5A illustrates an example of the voice notification. Referring to FIG. 5A, voice notification N11 dedicated to a user U1 is output from the controller 100. The voice notification N11 has content for proposing to watch broadcast contents recommended for the user U to the user U1. The user U1 can approve or reject the proposal through the voice notification N11 by a voice command or another user input. Here, the user U1 does not respond to the voice notification N11 since another work preoccupies the user U1 or a volume of the voice notification N11 is not sufficient.

Figure 5B:
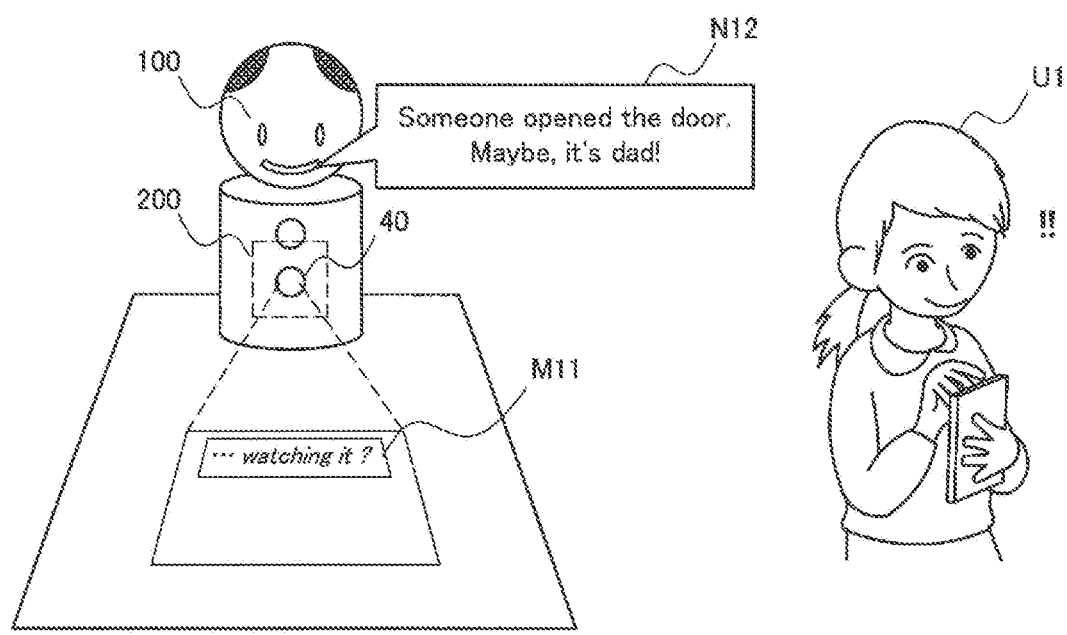
FIG. 5B is an explanatory diagram illustrating a first example of display of a message corresponding to voice notification.

FIG. 5B illustrates a first example of display of a message corresponding to voice notification performed after a certain time interval elapses from the output of the voice notification N11. Here, the auxiliary agent 200 is in the same device as the controller 100 and displays a message using the display device 40. With reference to FIG. 5B, the auxiliary agent 200 displays a message M11 corresponding to the voice notification N11 in accordance with an instruction from the controller 100. The controller 100 outputs new voice notification N12 instead of repeating the voice notification N11.

Figure 5C:
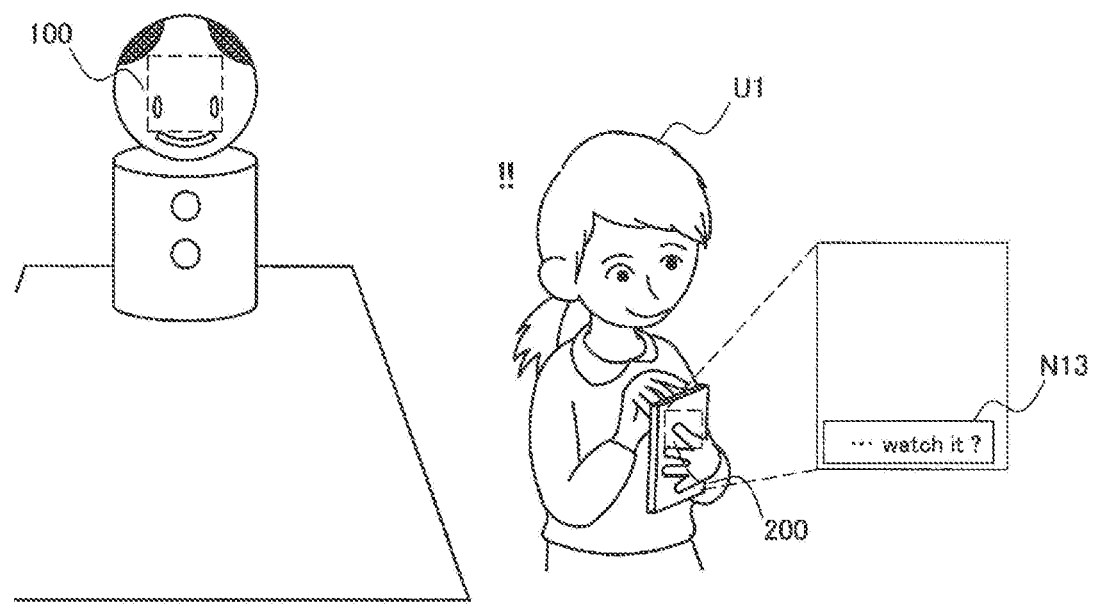
FIG. 5C is an explanatory diagram illustrating a second example of display of a message corresponding to voice notification.

FIG. 5C illustrates a second example of display of a message corresponding to voice notification performed after a certain time interval elapses from an output of the voice notification N11. Here, the auxiliary agent 200 is in a device separate from the controller 100 and receives a message from the controller 100 via a communication interface. Referring to FIG. 5C, the auxiliary agent 200 displays a message M13 corresponding to the voice notification N11 on a display terminal used by the user U1 in accordance with an instruction from the controller 100.

The display control unit 160 may cause the auxiliary agent 200 to display a plurality of messages respectively corresponding to a plurality of pieces of output voice notification. In addition, the display control unit 160 may make an announcement for prompting the user to see a displayed message using the announcement device 41. The announcement for prompting confirmation of a message may be, for example, vibration of a vibrator or turning on or flicking an LED lamp with a specific color or pattern.

Figure 5D:
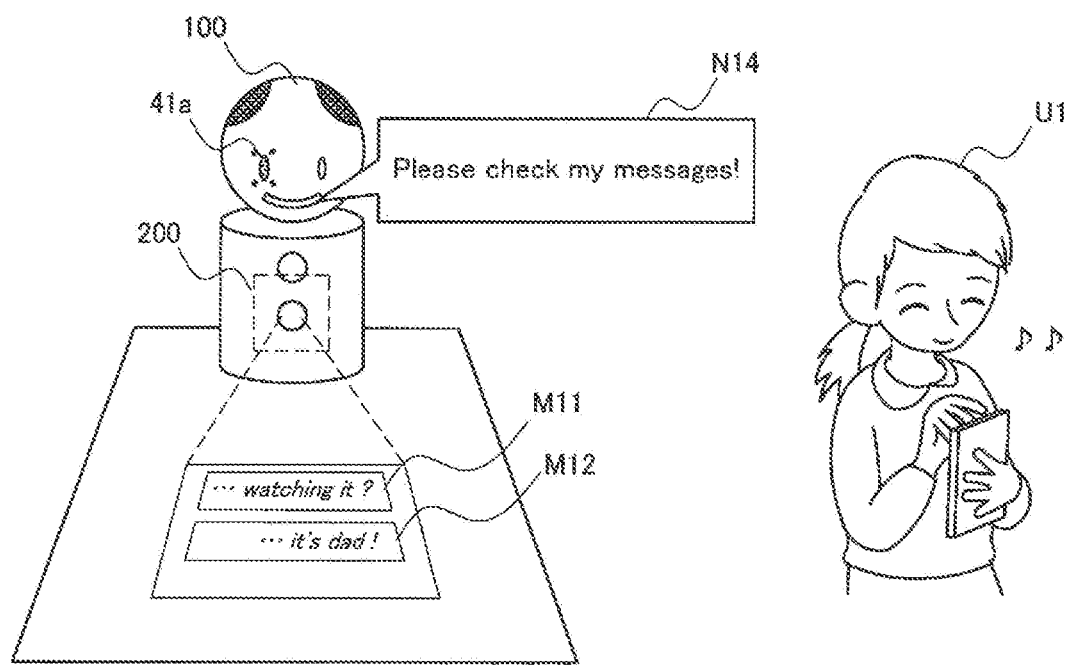
FIG. 5D is an explanatory diagram illustrating an example of an announcement for prompting confirmation of a message corresponding to the voice notification.

FIG. 5D illustrates an example of an announcement for prompting confirmation of a message corresponding to the voice notification. Here, the auxiliary agent 200 is in the same device as the controller 100. Referring to FIG. 5D, the auxiliary agent 200 displays the message M11 corresponding to the voice notification N11 and a message M12 corresponding to the voice notification N12 in accordance with an instruction from the controller 100. The controller 100 outputs reminding notification N14 by voice. In addition, the auxiliary agent 200 announces presence of a message indicating a wait of a response by the user by turning on an LED lamp 41*a*.

FIG. 6 is an explanatory diagram illustrating a first scenario for display of a message corresponding to voice notification. In the first scenario, voice notification N21 is first output from the controller 100 at time t21. Subsequently, at time t22 after a time interval T1 elapses from time t21, a message M21 corresponding to the voice notification N21 is displayed by the auxiliary agent 200. The message M21 disappears at time t23 after time t22 since a user input is detected. The reason why the message M21 disappears is that a notification condition may not be satisfied due to expiration of a display period decided in advance or a change in a status to be described below.

In a case in which voice notification with content for requesting a response of a user is output, the display control unit 160 may cause the auxiliary agent 200 not to display a message corresponding to the voice notification when the response of the user is detected before the elapse of the time interval. FIG. 7 is an explanatory diagram illustrating a second scenario for display of a message corresponding to the voice notification. Even in the second scenario, the voice notification N21 is output from the controller 100 at time t21. Subsequently, before a time t22 corresponding to an elapsed time point of the time interval T1 comes, the user U1 issues a voice command C21 in response to the voice notification N21 at time t24. In this case, the display control unit 160 comprehends that the necessity for displaying the message M21 corresponding to the voice notification N21 is lost now through recognition of the voice command. Thus, even when time 122 comes, the display control unit 160 causes the auxiliary agent 200 not to display the message M21.

The display control unit 160 may cause the auxiliary agent 200 not to display a message corresponding to the voice notification output in a case in which a status regarding the controlled device 10 satisfies a predetermined notification condition, in a case in which the status does not satisfy the notification condition before the time interval elapses. FIG. 8 is an explanatory diagram illustrating a third scenario for display of a message corresponding to the voice notification. Even in the third scenario, the voice notification N21 is output from the controller 100 at time t21. The voice notification N21 has content for proposing that the user U1 watches specific broadcast contents in the controlled device 10*b* and is output under the condition that the broadcast content is not being reproduced. Subsequently, before time t22 corresponding to an elapsed time point of the time interval T1 comes, the user U1 manipulates the controlled device 10*b* without using the controller 100 to start watching recommended broadcast contents at time t25. In this case, the display control unit 160 now comprehends that the notification condition of the voice notification N21 is not satisfied through a report from the controlled device 10*b*. Thus, even when time t22 comes, the display control unit 160 causes the auxiliary agent 200 not to display the message M21.

As described above, the auxiliary agent 200 can be mounted using any of various types of display device. For example, any type of display device is integrated with the same device as the controller 100. Other types of display devices are devices separate from the controller 100. The devices separate from the controller 100 can be further classified into fixed types of devices and devices with mobility. The display control unit 160 may set a time interval between output of the voice notification and display of a corresponding message in accordance with a type regarding such an installation location or mobility of the display device displaying a message. The type regarding the installation location can be classified into, for example, the same device, the inside of an environment, or the outside of the same environment. The type of the mobility can be classified into, for example, non-mobility (fixation) and mobility.

FIG. 9 is an explanatory diagram illustrating a fourth scenario for display of a message corresponding to the voice notification. In the fourth scenario, there are three auxiliary agents 200. One of the auxiliary agents is integrated with the controller 100 in a device including the display device 40*a*. Another auxiliary agent is mounted on the fixed display terminal 40*b* installed in the same environment as that of the controller 100. The remaining auxiliary agent is mounted on the display terminal (mobile terminal) 40*c* with mobility. At time t31, voice notification N31 is first output from the controller 100. Subsequently, at time t35 after a time interval T32 elapses from time t31, a message M31 corresponding to the voice notification N31 is displayed by the display device 40*a*. Subsequently, at time t36 after a time interval T33 elapses from time t31, a message M32 corresponding to the voice notification N31 is displayed on the fixed display terminal 40*b*. The time interval T33 is longer than the time interval T32. In a case in which a user input is detected or the notification condition is not satisfied before the time interval T33 elapses, the message M32 may not be displayed. Subsequently, at time t37 after the time interval T34 elapses from time t31, a message M33 corresponding to the voice notification N31 is displayed on the mobile terminal 40*c*. The time interval T34 is longer than the time intervals T32 and T33. In the case in which the user input is detected or the notification condition is not satisfied before the time interval T34 elapses, the message M33 may not be displayed. In this way, by displaying a message with a time difference in order from the display device nearer from the controller 100, it is possible to reduce inconvenience that a message is excessively frequently displayed for a user who is not in a controlled environment or a user who is not interested in the control.

In a case in which there are the plurality of auxiliary agents 200 as in the fourth scenario, the display control unit 160 may select an auxiliary agent (or a display device) that displays a message under a predetermined selection condition.

Hereinafter, examples of the selection condition are listed along with description of assumed cases. Note that the selection conditions may be combined:

selection condition 1: a type of display device,
a message corresponding to voice notification related to only a user who is in a specific environment can be displayed by a display device installed to be fixed to the environment;

selection condition 2: a current position of a display device,
a message corresponding to voice notification related to only a user who is in a specific environment is not displayed on a mobile terminal located at a location distant from the environment;

selection condition 3: an attribute of a user,
a message corresponding to voice notification related to security is not displayed on a mobile terminal of a user of an age less than a threshold;

selection condition 4: presence of a user,
any message is not displayed on a display device which is in an environment in which there is no user;

selection condition 5: authority of a user, a message corresponding to voice notification related to a certain controlled device can be displayed only on a display device designated by a user who has authority involved in control of the controlled device; and selection condition 6: priority of a message, a message corresponding to voice notification to which high priority is given can be displayed preferentially or forcibly on a display device which is used by all users or a specific user irrespective of another condition.

FIG. 10 is an explanatory diagram illustrating a fifth scenario for display of a message corresponding to the voice notification. In the fifth scenario, there are three auxiliary agents 200. One of the auxiliary agents is integrated with the controller 100 in a device including the display device 40a. Another auxiliary agent is mounted on the mobile terminal 40c which is used by a user U2. The remaining auxiliary agent is mounted on the mobile terminal 40d which is used by the user U1. At time t41, voice notification N41 is first output from the controller 100. Subsequently, at time t45 after a time interval T42 elapses from time t41, the message M41 corresponding to the voice notification N41 is displayed by the display device 40a. Subsequently, at time t46 after a time interval T43 elapses from time t41, a message M42 corresponding to the voice notification N41 is displayed on the mobile terminal 40c. The time interval T43 is longer than the time interval T42. On the other hand, the message corresponding to the voice notification N41 is not displayed on the mobile terminal 40d irrespective of the elapse of the time. The reason why the message corresponding to the voice notification N41 is not displayed is that, for example, the user U1 is not in a specific environment, the age of the user U1 is less than the threshold, or the user U1 does not have authority involved in the voice notification N41. In this way, by selectively deciding a device that displays a message corresponding to the voice notification under the predetermined selection condition, it is possible to suppress display of an unnecessary message and ensure safety associated with control of the controlled device.

In a case in which a user input (for example, a voice command) for requesting the auxiliary agent 200 to transmit notification is detected, the display control unit 160 may instruct the auxiliary agent 200 to display a message corresponding to the novice notification. In this case, irrespective of the above-described time interval, the message corresponding to the voice notification can be displayed by the auxiliary agent 200. In a case in which a user is a situation in which the user may not return an appropriate response although the user hears the voice notification, a timing at which the user responds to the notification can be postponed utilizing the auxiliary agent 20X).

3. CONFIGURATION EXAMPLE OF AUXILIARY AGENT

FIG. 11 is a block diagram illustrating an example of a configuration of a logical function of the auxiliary agent 200 according to an embodiment. The auxiliary agent 200 includes a user interface unit 210 and a display control unit 220. In the example of FIG. 11, the user interface unit 210 is connected to one or more input interfaces 46. The display control unit 220 is connected to the communication interface 35 and the display device 40.

The user interface unit 210 has a role of performing an interaction with a user by the auxiliary agent 200. For example, the user interface unit 210 detects a user input via the input interface 46 and outputs a user input signal to the display control unit 220. The input interface 46 may include any input means such as a touch sensor, a keyboard, a keypad, a button, a switch, a camera, a microphone, a human detection sensor, a vibration sensor, or an attitude sensor. The user interface unit 210 may recognize a voice command using a voice recognition technology as the user input or may recognize a gesture command from a captured image, as in the controller 100.

The display control unit 220 is connected to the controller 110 via a connection line inside the same device or the communication interface 35. In a case in which voice notification is output toward a user by the controller 100, the display control unit 220 causes the display device 40 to display a message corresponding to the voice notification in accordance with an instruction received from the controller 100. In the embodiment, after a certain time interval elapses from output of voice notification, the display control unit 220 causes the display device 40 to display a message corresponding to the voice notification.

As one example, the display control unit 220 may cause the display device 40 to display only a single message using a simple display item such as a dialog box or a popup window. As another example, the display control unit 220 may also cause the display device 40 to display a message window that has one or more message items. In the latter example, each message item can display information for identifying a corresponding controlled device and a message corresponding to voice notification regarding the controlled device. The information for identifying the controlled device may be text information such as a name or an identifier of a device or may be image information such as an icon.

Figure 12:
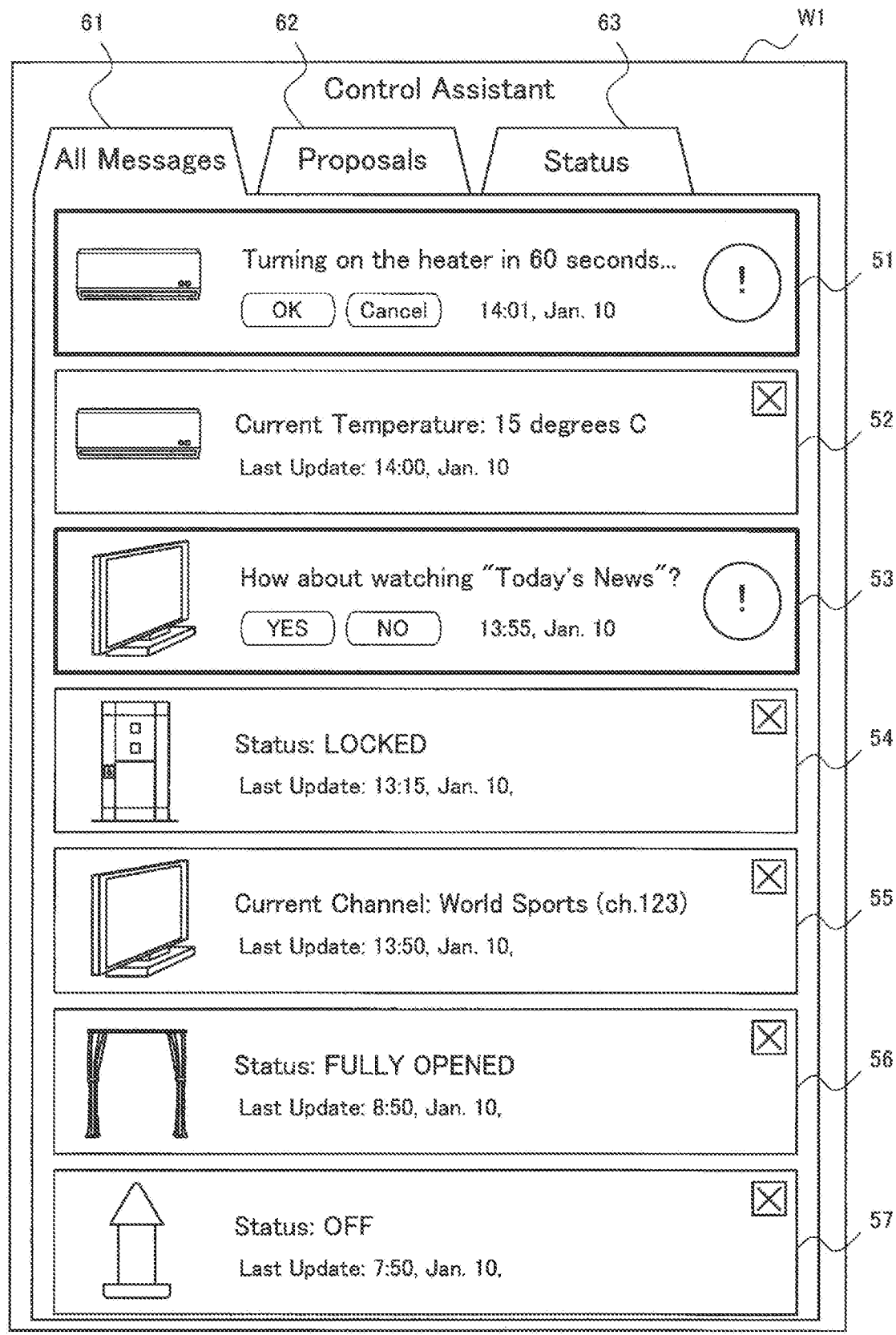
FIG. 12 is an explanatory diagram illustrating an example of a basic configuration of a message window according to an embodiment.

FIG. 12 is an explanatory diagram illustrating an example of a basic configuration of a message window according to an embodiment. Referring to FIG. 12, a message window W1 that has a plurality of message items for displaying a plurality of messages is illustrated. The message window W1 has a tab format and includes a first tab 61, a second tab 62, and a third tab 63 which can be mutually switched and displayed. The first tab 61 is an "All Messages" tab for displaying all effective message items. The second tab 62 is a "Proposals" tab for displaying message items associated with proposal from the controller 100 to a user. The third tab 63 is a "Status" tab for displaying message items associated with statuses collected by the controller 100.

In the example of FIG. 12, the first tab 61 has message items 51, 52, 53, 54, 55, 56, and 57. An icon of each message item identifies a controlled device for which each message item displays a message corresponding to voice notification. The message item 51 displays a message for proposing that a user activate a heating function of the controlled device 10a which is an air conditioner. When the user approves the proposal through a user input (for example, touches an "OK" button) during displaying the proposal, the display control unit 220 signals that the proposal to the controller 100 is approved (for example, transmits a response). The user may directly give an approval to the controller 100, for example, through a voice command without being involved in the auxiliary agent 200. In addition, the user may directly manipulate the controlled device 10a. The message item 52 displays a message for notifying a user of an indoor temperature reported from the controlled device 10a as an environment status. In a case in which it is not necessary to display a status of the controlled device 10a, the user can set the message item 52 so that the message item 52 is not displayed by touching a "x" button located in the upper right corner of the message item 52. The message item 53 displays a message for proposing that a user switches a channel of the controlled device 10*b* which is a television device and watches a specific broadcast program. The message item 54 displays a message for notifying a user of a locked state of a door reported from the controlled device 10*d* which is a smart lock as an operation status. The message item 55 displays a message for notifying a user of information regarding a channel during display reported from the controlled device 10*b* as an operation status. The message item 56 displays a message for notifying a user of an opened or closed state reported from the controlled device 10*b* which is a curtain as an operation status. The message item 57 displays a message for notifying a user of a turned state reported from the controlled device 10*e* which is an exterior lamp as an operation status. The display control unit 220 may separately set a display attribute such as a color, a size, a shape, or a blinking pattern of an individual message item or a kind of animation for each kind type (a status report or an event report or proposal) of message or each priority in the message window W1.

Note that the configuration of the message window W1 illustrated in FIG. 12 is merely an example and a window that has another configuration may be provided. For example, the number of message items displayed in the message window may be the same as the number of controlled devices controlled or managed by the controller 100 (that is, one message item is provided for one controlled device). Thus, it is easy for a user to ascertain general situations of many controlled devices which are under environments while avoiding complication of display in the window. In addition, only one message item may be displayed for a plurality of controlled devices belonging to the same class (for example, one message item is provided for a plurality of illumination devices). In addition, a GUI item for inclusively returning an approval or a refusal in response to a plurality of proposing messages may be provided in the window. Content of the message may not match content of voice notification. For example, text of a message may be changed depending on a type of display device or an attribute of a target user. For junior users, text of a message may be processed or simplified so that the junior users can easily understand content of the message.

Figure 13:
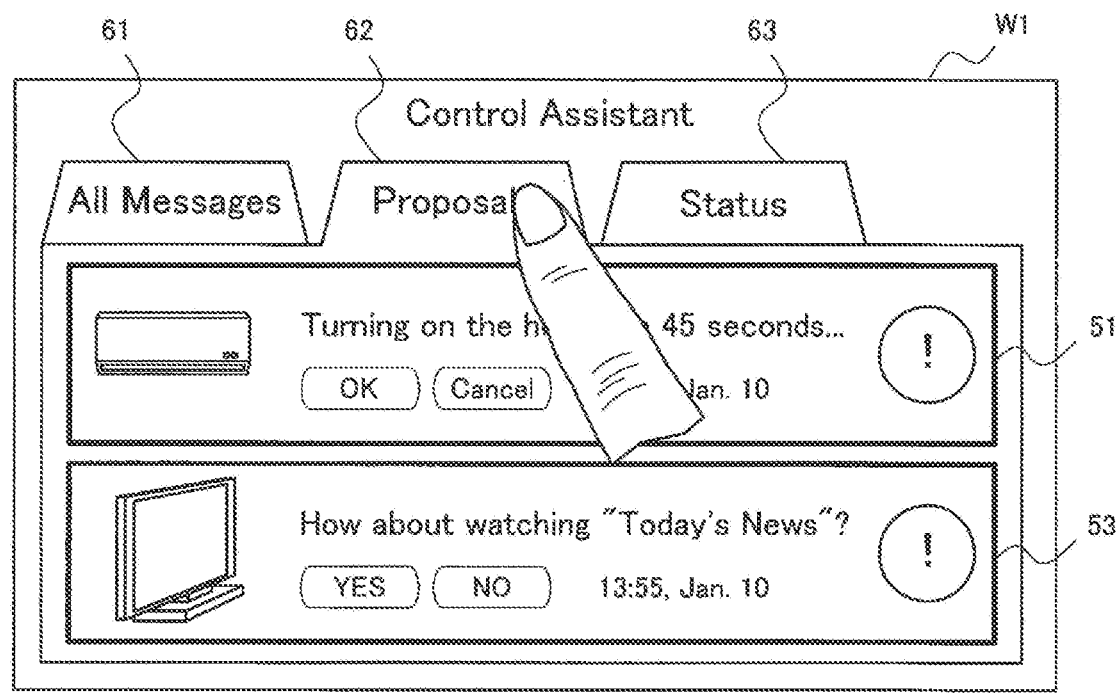
FIG. 13 is an explanatory diagram illustrating an example of switching of tabs on the message window illustrated in FIG. 12.

FIG. 13 is an explanatory diagram illustrating an example of switching of tabs on the message window W1 illustrated in FIG. 12. Referring to FIG. 13, the second tab 62 corresponding to the "Proposal" tab is displayed in the message window W1 as a result obtained when a user touches an index portion of the second tab 62. The second tab 62 includes message items 51 and 53, that is, only message items for displaying messages of proposals from the controller 100 to the user. The user can immediately recognize only a message requesting a response of the user and return an appropriate response (for example, an approval or a refusal of the proposal) through the selective display. A proposal in which a response of the user is not detected despite elapse of a predetermined time duration from display of a message may be treated as being approved of the proposal, or the proposal may be treated as being rejected.

The display control unit 220 can decide a display order of the message items in the window in order of time stamps of corresponding messages in the above-described message window W1. Here, the time stamp may indicate a time at which a corresponding message is displayed or received (from the controller 100) by the auxiliary agent 200 for the first time or may indicate a time at which corresponding voice notification is output from the controller 100. In the example of FIG. 12, the message items in the message window W1 are lined up in a descending order of the time stamps (newer items are located higher).

The display control unit 220 may cause the display device 40 to selectively display messages received from the controller 100 instead of causing the display device 40 to display all the received messages in the window. For example, the display control unit 220 may select the message items to be displayed in the message window in accordance with one of selection conditions 1 to 6 described above or a combination of two or more of selection conditions 1 to 6 (that is, in accordance with a type or a current position of the display device displaying the messages, an attribute, presence, or authority of the user, or priority of messages) in relation to the display control unit 160 of the controller 100.

Figure 14:
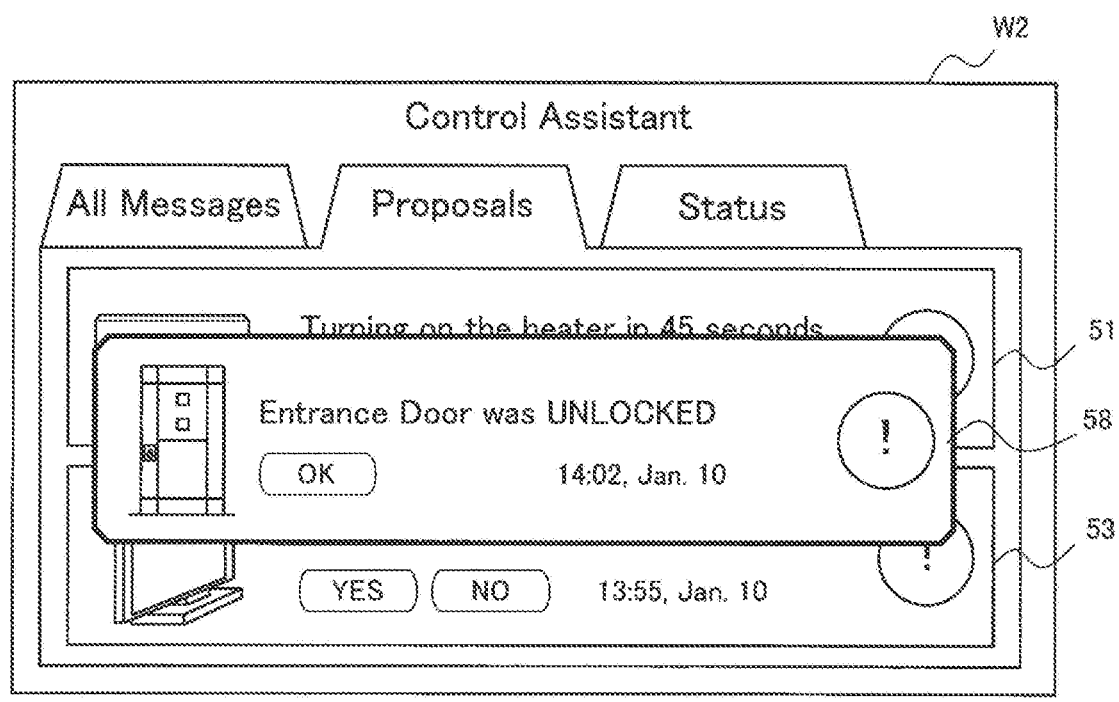
FIG. 14 is an explanatory diagram illustrating an example of display of a message item with high priority.

The display control unit 220 may preferentially display a message in which high priority is set in the message window irrespective of the above-described display order. FIG. 14 is an explanatory diagram illustrating an example of display of a message item with high priority. Referring to FIG. 14, a message item 58 is displayed in a form superimposed on the message items 51 and 53 in a message window W2. The message item 58 displays a message for notifying a user of an event indicating a door is unlocked in the controlled device 10*d* which is a smart lock. The priority may be granted to each message on the basis of setting registered in advance in the controller 100 or the auxiliary agent 200 (for example, setting of each controlled device, each kind of voice notification, or each kind of message for each controlled device). When preferential or forcible display is performed, for example, a message which it is preferable for a user to necessarily confirm, for example, in terms of security or the like can be reliably delivered to the user.

Figure 15A:
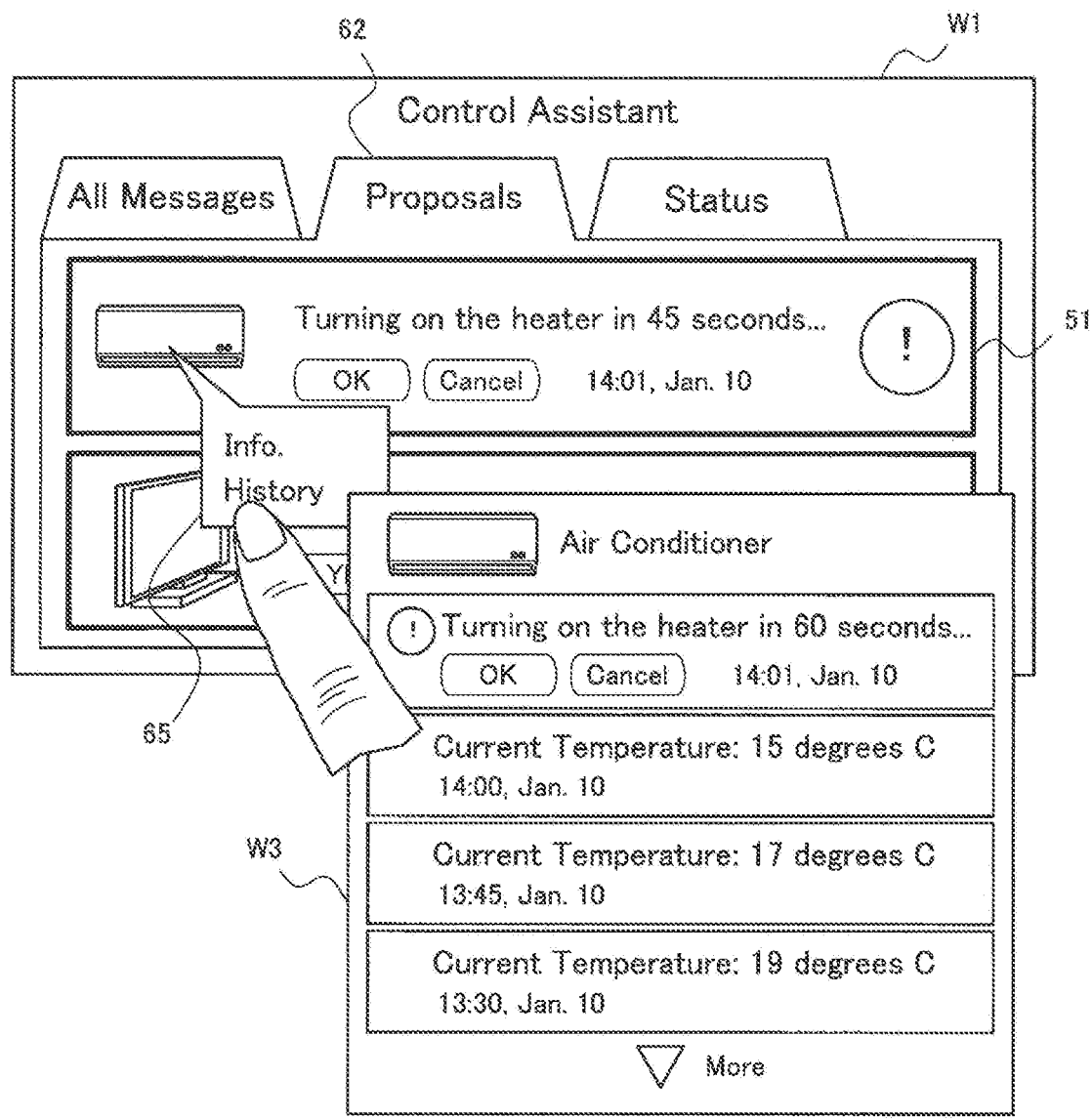
FIG. 15A is an explanatory diagram illustrating another example of the display of the message item.

FIG. 15A is an explanatory diagram illustrating another example of the display of the message item. In FIG. 15A, the message window W1 described with reference to FIG. 13 is illustrated again. A menu item "History" in a popup menu 65 displayed by touching an icon of the message item 51 is touched by a user. In addition, as a result, a history window W3 in which a history of messages regarding the controlled device 10 corresponding to the message item 51 is shown chronologically is displayed. By additionally providing a window in which only a message unique to one device is displayed, it is easy to also deliver details such as a change in a status in a specific controlled device or an event occurrence situation to the user while simply maintaining content of a main message window.

Figure 15B:
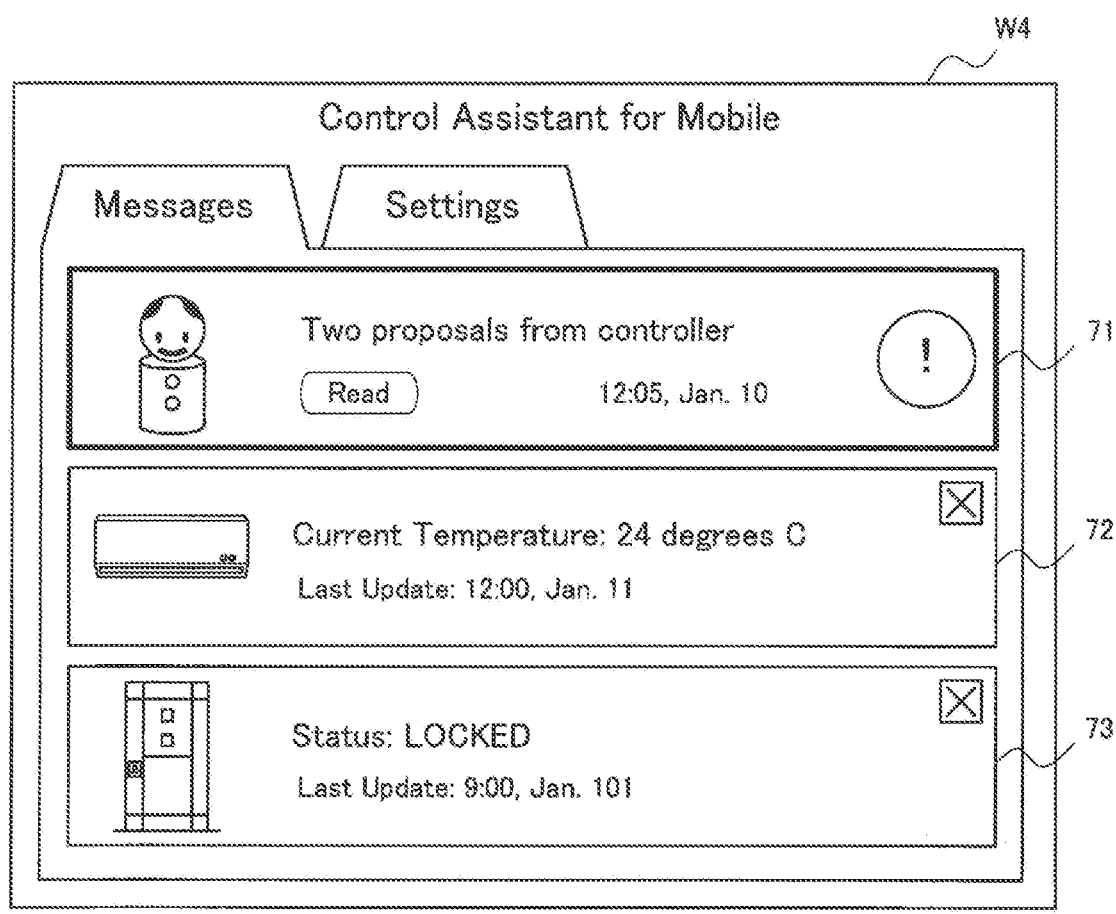
FIG. 15B is an explanatory diagram illustrating another example of the display of the message item.

FIG. 15B is an explanatory diagram illustrating another example of the display of the message item. In FIG. 15B, a message window W4 is illustrated as an example which can be displayed by the auxiliary agent 200 mounted particularly on a mobile terminal. The message window W4 has message items 71, 72, and 73. The message items 71, 72, and 73 are not all the messages received from the controller 100 and are items selected by the display control unit 220 under a predetermined selection condition (for example, items set by the user so that the items are displayed even when the user goes outside). In addition, the message item 71 indicates that two proposals from the controller 100 are reserved. For example, when the user touches a button "Read" included in the message item 71, two message items that respectively display content of the proposals can be loaded into the message window W4. When such selected messages are displayed, an uncomplicated interaction suitable for a behavior situation or the degree of interest of the user can be realized.

FIG. 16 is an explanatory diagram illustrating an example of a chronological change in the display of the message window. Referring to FIG. 16, a message item 81 that has a latest time stamp is first displayed in a message window W51 at time T=t51. In the message window W51, message items 82 and 83 are displayed in addition to the message item 81. The message item 81 has content in which a proposal to the user with regard to control of the controlled device 10a is indicated. The message item 82 has content in which a proposal to the user with regard to control of the controlled device 10b is indicated.

At time T=t52, the user approves the proposal from the controller 100 via the message item 82 by touching a button in the message item 82. In response to this user input, the message item 82 disappears from the message window W52 and a new message item 84 is displayed instead on the message item 81. The message item 84 has content indicating a change in a status of the controlled device 10b occurring as a result obtained when the user approves the proposal in the message item 82.

At time T=t53, for example, it is assumed that a notification condition of voice notification corresponding to the message item 81 is satisfied as a result obtained when the user manipulates the controlled device 10a (without being involved in the auxiliary agent 200). Then, the message item 81 disappears from the message window W52 and a new message item 85 is displayed instead on the uppermost stage. The message item 85 has content indicating a change in a status of the controlled device 10a occurring as a result obtained when the user manipulates the controlled device 10a.

At time T=t54, a new message item 86 is displayed on the uppermost stage using occurrence of a new event in the controlled device 10d as an opportunity. The message item 86 has content indicating a change in an operation status detected in the controlled device 10d as an event. In a case in which high priority is set in a status or an event regarding the controlled device 10d, the message item 86 can be preferentially displayed in the message window in a mode in which the message item 86 can be distinguished from the other message items (a display attribute).

The message window may have a role of a portal used for the user to unitarily manipulate one or more controlled devices 10 in an environment. For example, in a case in which a predetermined user input on a message item in the message window is detected, the display control unit 220 may cause the display device 40 to display a remote control window for remotely manipulating the controlled device 10 identified by the message item.

FIG. 17 is an explanatory diagram illustrating an example of transition from a message window to a remote control window On the upper left of FIG. 17, the same message window W51 as the message window illustrated in FIG. 16 is illustrated again. The message window W51 has message items 81, 82, and 83. For example, when the user performs flicking on the message item 81 corresponding to the controlled device 10a, the remote control window W52 for manipulating the controlled device 10a is displayed. When the user performs flicking on the message item 82, a remote control window W53 for manipulating the controlled device 10b is displayed. When the user performs flicking on the message item 83, a remote control window W54 for manipulating the controlled device 10c is displayed. When such a user interface is provided, the user can reject a proposal (or another notification) from the controller 100) and the user can also perform desired control quickly using the proposal as an opportunity in a case in which the proposal of the control is offered from the controller 100 and the proposal is not appropriate.

4. FLOW OF PROCESSES

[4-1. Process of Controlled Device]

Figure 18:
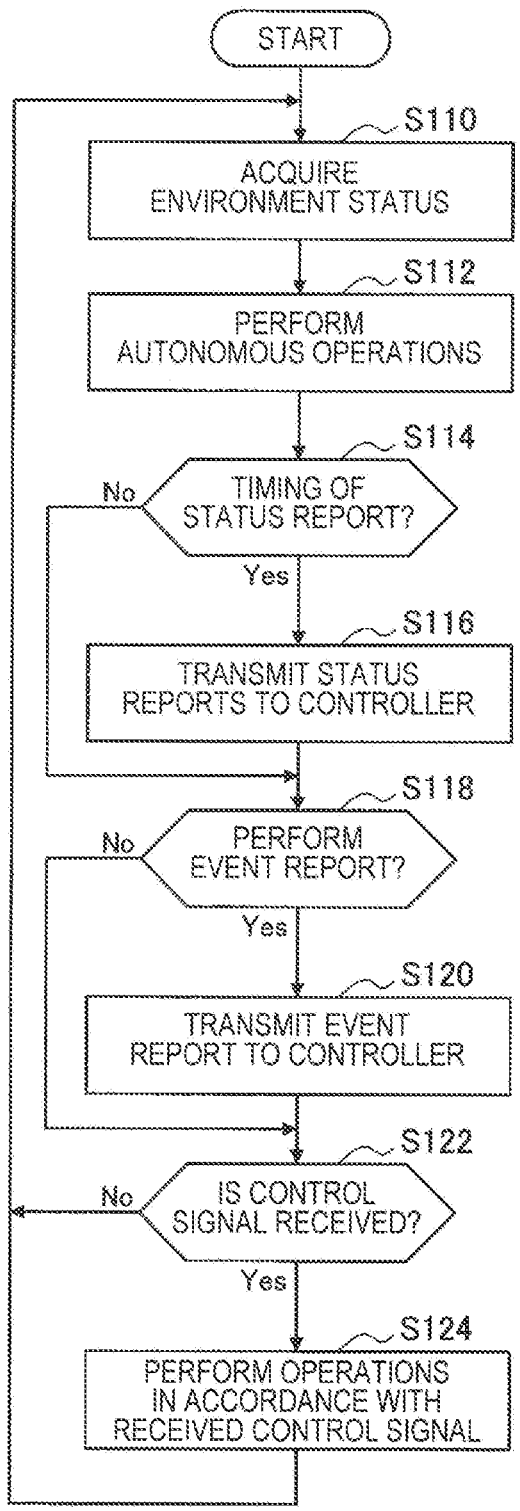
FIG. 18 is a flowchart illustrating an example of a flow of a process performed by the controlled device according to an embodiment.

FIG. 18 is a flowchart illustrating an example of a flow of a process performed by the controlled device 10 according to an embodiment. Referring to FIG. 18, the controlled device 10 first acquires environment statuses (step S110). For example, the air conditioner 10a can acquire a status such as environment temperature and environment humidity. Note that all kinds of controlled devices 10 may not necessarily acquire environment statuses. Accordingly, step S110 may be omitted.

Next, the controlled devices 10 perform autonomous operations (step S112). For example, the air conditioner 10a changes temperature of sent air on the basis of a difference between the environment temperature and a target temperature in a case in which the air conditioner 10a is operating. The television device 10b starts receiving, reproducing, or recording a target broadcast program on the basis of reservation data of watching reservation or recording reservation. The curtain 10c is changed from a closed state to an open state or from the open state to the closed state on the basis of setting of a timer.

Subsequently, the controlled devices 10 determine whether a timing of a status report comes (step S114). The timing of the status report can be set in advance periodically or can be set to a specific time. In a case in which the controlled devices 10 determine that the timing of the status report comes, the controlled devices 10 transmit the environment statuses or the operation statuses to the controller 100 (step S116).

Subsequently, the controlled devices 10 determine whether an event report is performed (step S118). For example, the smart lock 10d may determine unlocking of a door during a period set by the user or a failure of a trial of the unlocking of the door by a certain person as an event to be reported to the controller 100. In a case in which the controlled devices 10 determine that the event report is performed, the controlled devices 10 transmit the event report to the controller 100 (step S120).

Subsequently, the controlled devices 10 determine whether a control signal is received from the controller 100 or another device (step S122). In a case in which the control signal is received, the controlled devices 10 perform operations in accordance with the received control signal (step S124). For example, the exterior lamp 10e is turned on in a case in which a control signal for giving an instruction to turn the exterior lamp 10e on is received from the controller 100.

[4-2. Process of Controller]

Figure 19:
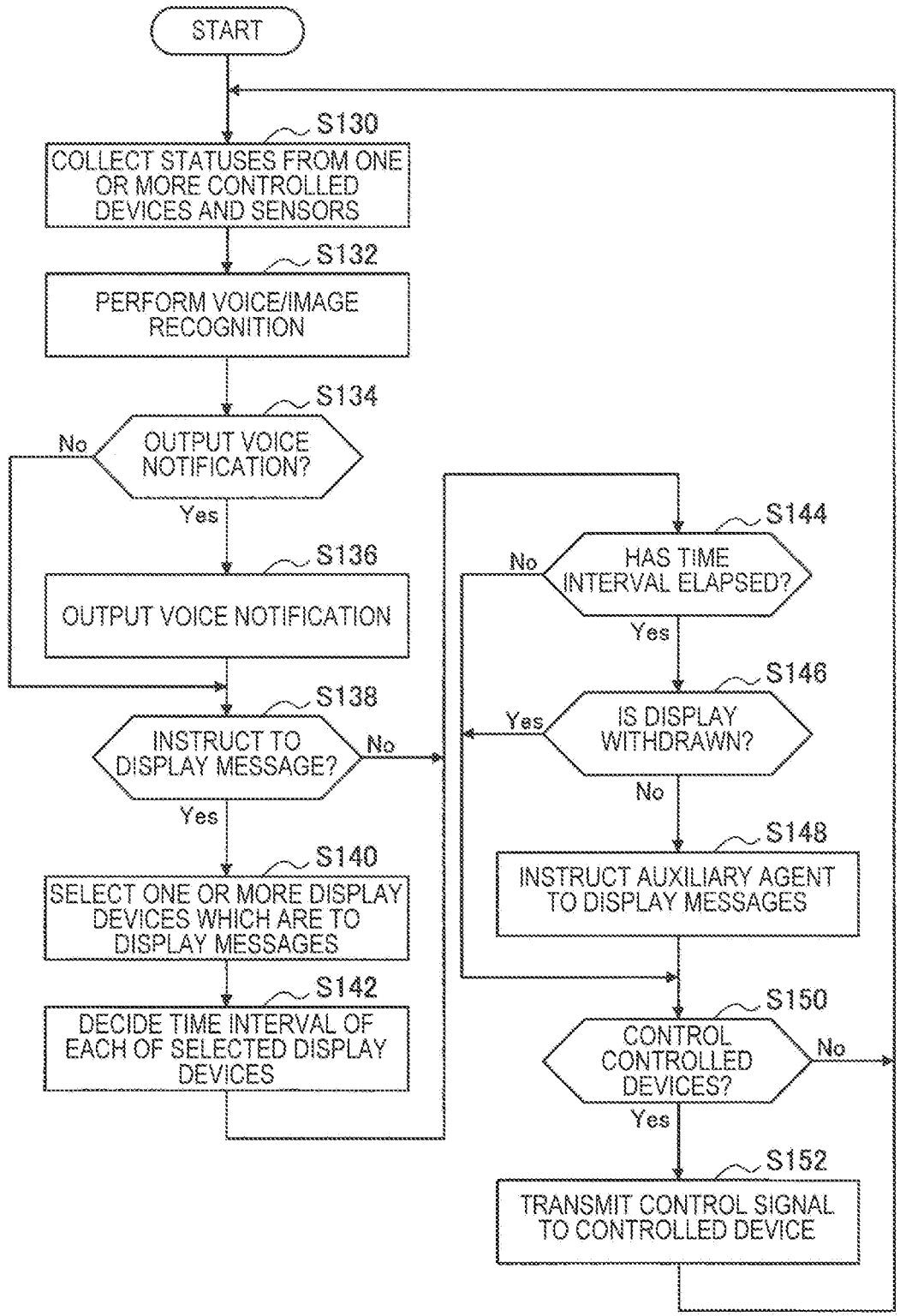
FIG. 19 is a flowchart illustrating an example of a flow of a process performed by the controller according to an embodiment.

FIG. 19 is a flowchart illustrating an example of a flow of a process performed by the controller 100 according to an embodiment. Referring to FIG. 19, the device control unit 140 first collects environment statuses and operation statuses from one or more controlled devices 10 and one or more sensors 34 (step S130). The device control unit 140 may acquire, for example, supplementary information such as an electronic program table or weather data in addition to the statuses from an external server.

Subsequently, the voice recognition unit 120 detects presence of a user by performing voice recognition and identifies the user or detects a voice command spoken by the user (step S132). In addition, the image recognition unit 130 can detect the presence of the user by performing image recognition and identify the user or detect a gesture command.

Subsequently, the device control unit 140 determines whether the user-oriented voice notification is output by determining a related notification condition with regard to each controlled device 10 (step S134). This determination can be based on indexes such as the environment statuses and operation statuses collected in step S130, the presence of the user acquired in step S132, and a date. When the device control unit 140 determines that one or more user pieces of—oriented voice notification are output, the device control unit 140 causes the voice notification unit 110 to output the pieces of voice notification in order via the speaker 31 (step S136).

Subsequently, the display control unit 160 determines whether messages corresponding to the voice notification output by the voice notification unit 110 is displayed by the auxiliary agent 200 (step S136). In a case in which the display control unit 160 determines what the messages are displayed by the auxiliary agent 200, the display control unit 160 selects one or more display devices which are to display the messages (step S140) or the display control unit 160 decides the time interval of each of the selected display devices on the basis of, for example, the types of display devices, presence of the user, or priority of the messages (step S142).

Subsequently the display control unit 160 determines whether the time interval decided in step S142 has elapsed with regard to the individual message to be displayed (step S144). In a case in which a response of the user to be requested is detected or the corresponding notification condition is not satisfied before the time interval elapses, the display control unit 160 withdraws the display of the messages. In a case in which the time interval has elapsed and the withdrawal of the display of the messages does not end (step S146), the display control unit 160 instructs the auxiliary agent 200 to display the messages corresponding to the voice notification (step S148).

Subsequently, the device control unit 140 determines whether the controlled devices 10 are controlled (step S150). For example, in a case in which a user input for giving an instruction to control the controlled devices 10 is detected, the device control unit 140 decides to control the controlled devices 10. Here, the user input can be detected as a voice command, a gesture command, or another input by the controller 100 or can be detected through signaling (for example, an approval of proposal of a control operation) from the auxiliary agent 200. When the device control unit 140 decides to control the controlled devices 10, the device control unit 140 transmits a control signal to the controlled devices 10 (step S152).

[4-3. Process of Auxiliary Agent]

Figure 20:
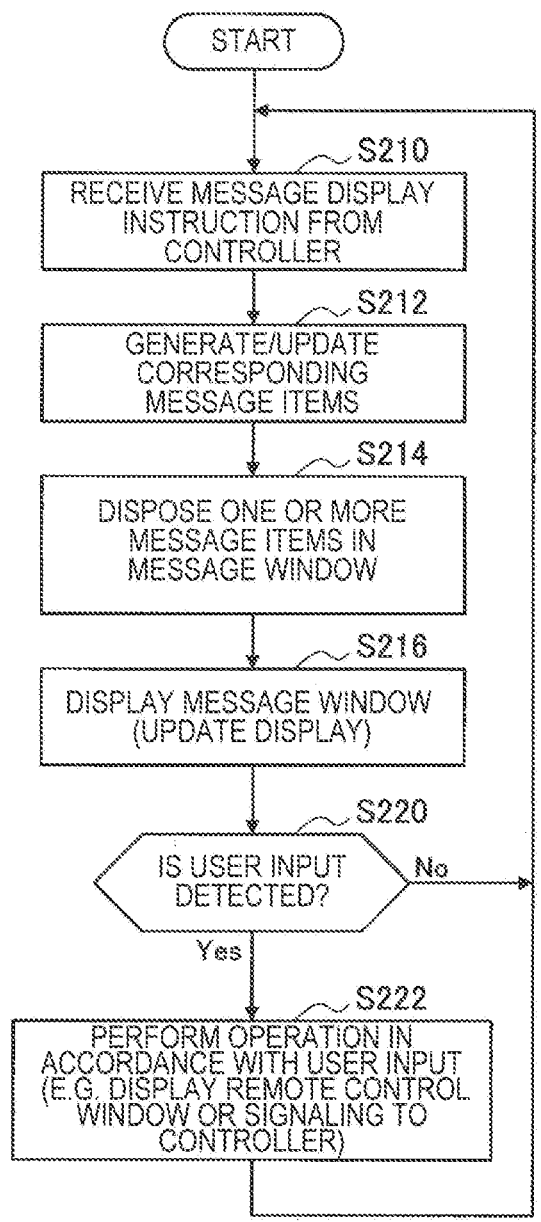
FIG. 20 is a flowchart illustrating an example of a flow of a process performed by an auxiliary agent according to an embodiment.

FIG. 20 is a flowchart illustrating an example of a flow of a process performed by an auxiliary agent 200 according to an embodiment. Referring to FIG. 20, the display control unit 220 first receives a message display instruction from the controller 100 via the connection line in the same device or the communication interface 35 (step S210).

Subsequently, the display control unit 220 generates a message item corresponding to a message instructed to be displayed (after a time interval allocated to the message elapses) or updates an existing message item so that a newly instructed message is displayed (step S212).

Subsequently, the display control unit 220 forms a latest message window by disposing one or more valid message items in a window (step S214). For example, the display control unit 220 can filter messages to be displayed under a predetermined selection condition and rearrange the message items in a predetermined display order.

Subsequently, the display control unit 220 causes the display device 40 to display the message window formed by the one or more valid message items (updates the display in a case in which a message window has already been displayed) (step S220).

In addition, the user interface unit 210 monitors a user input via, for example, the input interface 46 (step S220). When the user input is detected by the user interface unit 210, the display control unit 220 performs an operation in accordance with the detected user input (step S222). The operation performed herein may be any operation, for example, switching of tabs in the message window, display of a remote control window for manipulating the designated controlled device 10, or signaling for delivering an approval or a refusal of proposal to the controller 100.

5. COOPERATION WITH EXTERNAL SERVER

In the previous sections, the example in which the interaction system includes the single controller 100 and one or more auxiliary agents 200 has been described. However, the present disclosure is not limited to the example. The controller 100 may be embodied by a plurality of devices that cooperate with each other.

Figure 21A:
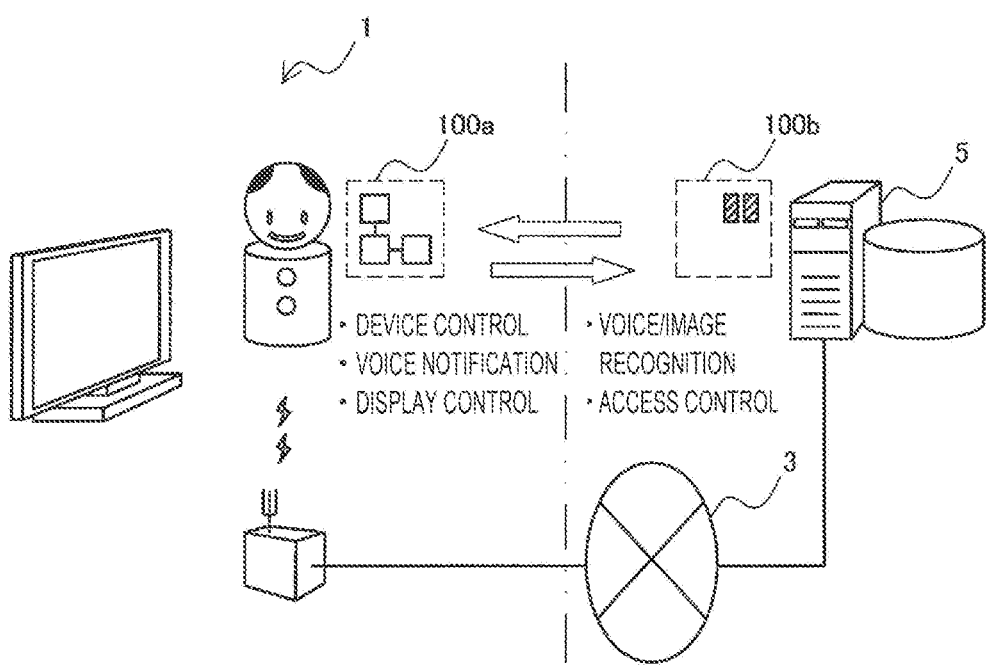
FIG. 21A is an explanatory diagram illustrating a first example of cooperation with an external server.

FIG. 21A is an explanatory diagram illustrating a first example of cooperation with an external server. Referring to FIG. 21A, in addition to a controller 100a which is in the environment 1, an external server 5 communicating with the controller 100a via a network 3 is illustrated. Then, a controller 100b operates on the external server 5. The controller 100a includes, for example, the voice notification unit 110, the device control unit 140, and the display control unit 160 in the functional block of the controller 100 illustrated in FIG. 4. On the other hand, the controller 100b includes the voice recognition unit 120 and the image recognition unit 130 in the functional block of the controller 100 illustrated in FIG. 4. The controller 100a transmits a voice signal acquired via the microphone 32 or voice feature data extracted from the voice signal to the controller 100b and entrusts recognition of a voice command to the controller 100b. In addition, the controller 100a transmits an image signal acquired via the camera 33 or image feature data extracted from the image signal to the controller 100b and entrusts image recognition to the controller 100b. The controller 100 performs the entrusted voice recognition or image recognition using abundant processing resources and massive dictionary data and returns a performed result to the controller 100a. The controller 100a controls an interaction with a user and the controlled devices 10 on the basis of the recognition result returned from the controller 100b. Note that distribution of functions of the controllers 100a and 100b is not limited to the example described herein.

The controller 100b may have a role of controlling access from a terminal outside the environment 1 or to the controller 100a or other devices in the environment 1. In addition, a separate device (for example, a home gateway (not illustrated)) from the external server 5 may have a role of the access control.

Figure 21B:
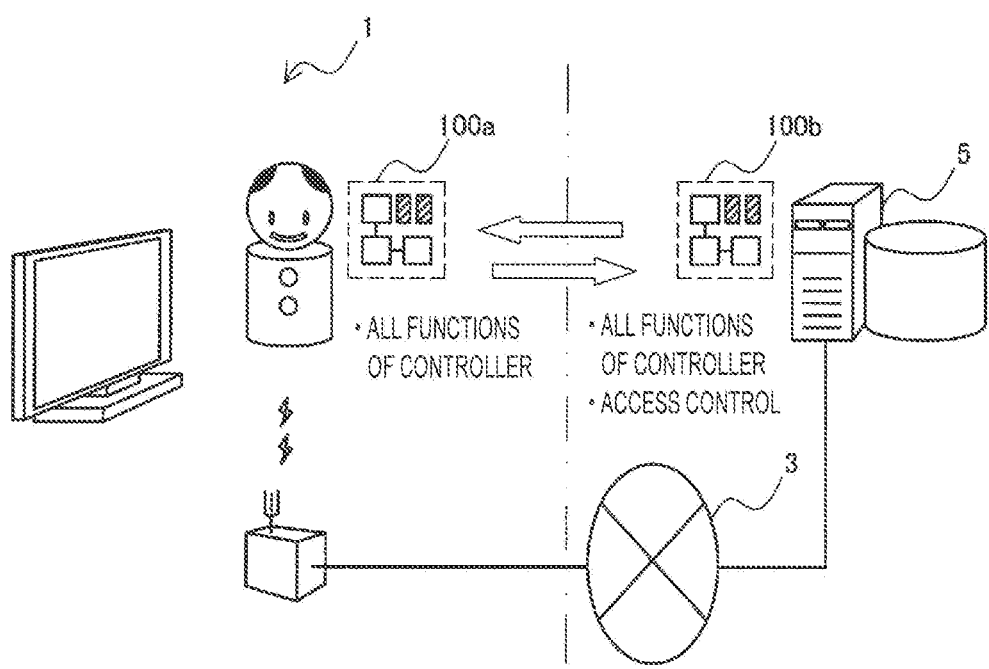
FIG. 21B is an explanatory diagram illustrating a second example of cooperation with an external server.

FIG. 21B is an explanatory diagram illustrating a second example of cooperation with an external server. Referring to FIG. 21B, the controller 100a which is in the environment 1, the external server 5 communicating with the controller 100a, and the controller 100b operating on the external server 5 are illustrated again. In the second example, the controller 100a includes all the units in the functional block of the controller 100 illustrated in FIG. 4. The controller 100b also includes all the units in the functional block of the controller 100 illustrated in FIG. 4. Here, processing resources and storage resources available in the controller 100a are less than processing resources and storage resources available in the controller 100b. For example, when a load of processes such as voice recognition, image recognition, control of the controlled devices, or display control exceeds a capacity, the controller 100a entrusts some of the processes to the controller 100b. When the load of the processes is low, the controller 100a performs the processes alone.

6. CONCLUSION

The embodiments of the technology according to the present disclosure have been described above with reference to FIGS. 1 to 21B. According to the foregoing embodiments, the user-oriented voice notification regarding at least one controlled device is output from the controller that controls one or more controlled devices and the message corresponding to the voice notification is displayed by the display device. Accordingly, even when the voice notification does not arrive at the user or the user fails to hear the voice notification, the user can confirm the content of the displayed message later and respond to the message as necessary. By guaranteeing such complementary interaction means, the controller that mainly performs a voice interaction may not excessively repeat the user-oriented voice notification. By mixing such a voice interaction and such a visual interaction, it is possible to improve reliability, timeliness, or selectivity of information delivery, and thus it is possible to improve convenience for a user.

In addition, according to the foregoing embodiments, a message corresponding to voice notification is displayed after a certain time interval elapses from output of the voice notification. Accordingly, a time suspension necessary for the user to take an appropriate action in response to the voice notification is ensured. Then, it is possible to avoid a situation in which a message corresponding to voice notification is unnecessarily displayed in a case which an objective of the voice notification is achieved because of a rapid response of the user or a change in statues of the controlled devices or effectiveness of content of voice notification becomes unnecessary.

In addition, according to the foregoing embodiments, the time interval until the individual display device displays the message can be decided dynamically in accordance with the type of display device that displays the message. Accordingly, for example, only in a case in which a user who is in an environment in which the controlled devices are installed first is caused to pay attention to notification but an appropriate response may not be obtained nevertheless, it is possible to realize a step-by-step interaction for attracting user's attention otherwise.

In addition, according to the foregoing embodiments, the message corresponding to the voice notification is displayed along with information for identifying the corresponding controlled device in the message window in which one or more message items are listed. Accordingly, the user can simply ascertain general situations of the plurality of controlled devices which are under environments through the message window. In addition, the user can later return a response which may not have been returned at the time of outputting the voice notification through a GUI item provided on a message item. In addition, by changing a message to be displayed in accordance with setting of each display terminal, it is possible to reduce a possibility that an important message or a message in which a user is particularly interested is missed.

Note that according to the foregoing embodiments, a main interaction between the controller and a user is realized through a voice interaction and a visual interaction is complementarily provided. However, the present disclosure is not limited to this example. Another type of interaction means (for example, subtitles for displaying information serially or a gesture interaction such as sign language) that has a similar nature to voice interaction may be adopted instead of the voice interaction. In the technology according to the present disclosure, it is possible to complement a defect of the other type of interaction means through a visual interaction.

The various processes described in the present specification may be realized using one of software, hardware, and a combination of software and hardware. A program of the software is stored in advance in, for example, a storage medium (a non-transitory media) that is provided inside or outside of each device. Then, for example, each program is read to a random access memory (RAM) at the time of execution and is executed by a processor such as a central processing unit (CPU).

In addition, the processes described with reference to the flowcharts in the present specification may not necessarily be executed in the orders indicated in the flowcharts. Some of the steps of the processes may be performed in parallel. In addition, additional steps of processes may be adopted or some of the steps of the processes may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a device control unit configured to control one or more controlled devices:

a voice notification unit configured to output user-oriented voice notification regarding at least the one controlled device: and a display control unit configured to cause a display device to display a message corresponding to the voice notification output by the voice notification unit.

(2)

The control device according to (1), in which the display control unit causes the display unit to display the message corresponding to the voice notification after a certain time interval elapses from the output of the voice notification.

(3)

The control device according to (2), in which the voice notification includes content for requesting a response of a user, and in a case in which the reaction is detected before the elapse of the time interval, the display control unit causes the display device not to display the message corresponding to the voice notification.

(4)

The control device according to (2) or (3), in which the voice notification is output in a case in which a status regarding the controlled device satisfies a predetermined notification condition, and in a case in which the status does not satisfy the predetermined notification condition before the elapse of the time interval, the display control unit causes the display device not to display the message corresponding to the voice notification.

(5)

The control device according to any one of (2) to (4), in which the display control unit sets the time interval in accordance with a type regarding an installation location or mobility of the display device displaying the message.

(6)

The control device according to any one of (1) to (5), further including:

a recognition unit configured to recognize presence of a user near the control device, in which, in a case in which the recognition unit recognizes presence of the user, the voice notification unit outputs additional voice notification for prompting the user to see the message when the display device is able to display the message corresponding to the voice notification.

(7)

The control device according to any one of (1) to (6), in which the display device is a device separate from the control device.

(8)

The control device according to any one of (1) to (7), in which the one or more controlled devices include at least one of a first controlled device containing the control device and a second controlled device separate from the control device.

(9) A display device to be connected to a control device controlling one or more controlled devices and outputting user-oriented voice notification regarding at least the one controlled device, the display device including:

a display control unit configured to cause a display unit to display a message corresponding to the voice notification output by the control device in accordance with an instruction received from the control device.

(10)

The display device according to (9), in which the display control unit causes the display unit to display the message corresponding to the voice notification after a certain time interval elapses from the output of the voice notification by the control device.

(11)

The display device according to (9) or (10), in which the display control unit causes the display unit to display a message window that has one or more message items, and each message item displays information for identifying a corresponding controlled device and the message regarding the controlled device.

(12)

The display device according to (11), in which the display control unit selects a message item to be displayed in the message window in accordance with a type or current position of the display device, an attribute, presence, or authority of a user, or priority of the message.

(13)

The display device according to (11) or (12), in which the message window has the message item corresponding to each of the one or more controlled devices, and the display control unit decides a display order of the message items in the message window in order of time stamps of corresponding messages.

(14)

The display device according to (13), in which the display control unit causes a message in which high priority is set to be preferentially displayed in the message window irrespective of the display order.

(15)

The display device according to any one of (11) to (14), in which, in a case in which a predetermined user input for a certain message item in the message window is detected, the display control unit causes the display unit to display a remote control window for remotely manipulating a controlled device identified by using the message item.

(16)

The display device according to any one of (11) to (15), in which a number of message items displayed in the message window is the same as a number of controlled devices.

(17)

A control method performed by a control device controlling one or more controlled devices, the method including:

outputting user-oriented voice notification regarding at least the one controlled device; and causing a display device to display a message corresponding to the output voice notification.

(18)

A display control method performed by a display device connected to a control device controlling one or more controlled devices and outputting user-oriented voice notification regarding at least the one controlled device, the method including:

causing a display unit to display a message corresponding to the voice notification output by the control device in accordance with an instruction received from the control device.

(19)

A program causing a processor of a control device to function as:

a device control unit configured to control one or more controlled devices;

a voice notification unit configured to output user-oriented voice notification regarding at least the one controlled device; and a display control unit configured to cause a display device to display a message corresponding to the voice notification output by the voice notification unit.

(20)

A program causing a processor of a display device connected to a control device controlling one or more controlled devices and outputting user-oriented voice notification regarding at least the one controlled device, to function as:

a display control unit configured to cause a display unit to display a message corresponding to the voice notification output by the control device in accordance with an instruction received from the control device.

REFERENCE SIGNS LIST

1 environment
5 external server
10 controlled device 20 communication device
30 control device
40 display device
100 controller
110 voice notification unit
120 voice recognition unit
130 image recognition unit
140 device control unit
150 storage unit
160 display control unit
200 auxiliary agent
210 user interface unit
220 display control unit

The invention claimed is:

1. A control device comprising:
a device control unit configured to control one or more controlled devices;
a voice notification unit configured to output user-oriented voice notification regarding at least the one controlled device at a first time; and
a display control unit configured to cause a display device to delay display of a message corresponding to the voice notification until a second time after a certain time interval elapses from the output of the voice notification at the first time, and display the message corresponding to the voice notification only after the certain time interval elapses,
wherein the device control unit, the voice notification unit, and the display control unit are each implemented via at least one processor.

2. The control device according to claim 1,
wherein the voice notification includes content for requesting a response of a user, and
in a case in which the response of the user is detected before the certain time interval elapses, the display control unit causes the display device not to display the message corresponding to the voice notification.

3. The control device according to claim 1,
wherein the voice notification is output in a case in which a status regarding the controlled device satisfies a predetermined notification condition, and
in a case in which the status does not satisfy the predetermined notification condition before the certain time interval elapses, the display control unit causes the display device not to display the message corresponding to the voice notification.

4. The control device according to claim 1, wherein the display control unit sets the certain time interval in accordance with a type regarding an installation location or mobility of the display device displaying the message.

5. The control device according to claim 1, further comprising:
a recognition unit configured to recognize presence of a user near the control device,
wherein, in a case in which the recognition unit recognizes presence of the user, the voice notification unit outputs additional voice notification for prompting the user to see the message when the display device is able to display the message corresponding to the voice notification, and
wherein the recognition unit is implemented via at least one processor.

6. The control device according to claim 1, wherein the display device is a device separate from the control device.

7. The control device according to claim 1, wherein the one or more controlled devices include at least one of a first controlled device containing the control device and a second controlled device separate from the control device.

8. A display device to be connected to a control device controlling one or more controlled devices and outputting user-oriented voice notification regarding at least the one controlled device at a first time, the display device comprising:
a display control unit configured to cause a display device to delay display of a message corresponding to the voice notification until a second time after a certain time interval elapses from the output of the voice notification at the first time, and display the message corresponding to the voice notification only after the certain time interval elapses in accordance with an instruction received from the control device,
wherein the display control unit is implemented via at least one processor.

9. The display device according to claim 8,
wherein the display control unit causes the display device to display a message window that has one or more message items, and
each message item displays information for identifying a corresponding controlled device and the message regarding the controlled device.

10. The display device according to claim 9, wherein the display control unit selects a message item to be displayed in the message window in accordance with a type or current position of the display device, an attribute, presence, or authority of a user, or priority of the message.

11. The display device according to claim 9,
wherein the message window has the message item corresponding to each of the one or more controlled devices, and
the display control unit decides a display order of the message items in the message window in order of time stamps of corresponding messages.

12. The display device according to claim 11, wherein the display control unit causes a message in which high priority is set to be preferentially displayed in the message window irrespective of the display order.

13. The display device according to claim 9, wherein, in a case in which a predetermined user input for a certain message item in the message window is detected, the display control unit causes the display device to display a remote control window for remotely manipulating a controlled device identified by using the message item.

14. The display device according to claim 9, wherein a number of message items displayed in the message window is the same as a number of controlled devices.

15. A control method performed by a control device controlling one or more controlled devices, the method comprising:
outputting user-oriented voice notification regarding at least the one controlled device at a first time; and
causing a display device to delay display of a message corresponding to the output voice notification until a second time after a certain time interval elapses from the output of the voice notification at the first time, and display the message corresponding to the voice notification only after the certain time interval elapses.

16. A display control method performed by a display device connected to a control device controlling one or more controlled devices and outputting user-oriented voice notification regarding at least the one controlled device at a first time, the method comprising:
causing a display device to delay display of a message corresponding to the voice notification until a second time after a certain time interval elapses from the output of the voice notification at the first time, and display the message corresponding to the voice notification only after the certain time interval elapses in accordance with an instruction received from the control device.

17. A non-transitory computer-readable medium having embodied thereon a program which when executed by a processor of a control device, causes the processor to execute a control method, the method comprising:

controlling one or more controlled devices;

outputting user-oriented voice notification regarding at least the one controlled device at a first time; and causing a display device to delay display of a message corresponding to the voice notification until a second time after a certain time interval elapses from the output of the voice notification at the first time, and display the message corresponding to the voice notification only after the certain time interval elapses.

18. A non-transitory computer-readable medium having embodied thereon a program which when executed by a processor of a display device connected to a control device controlling one or more controlled devices and outputting user-oriented voice notification regarding at least the one controlled device at a first time, causes the processor to execute a display control method, the method comprising:

causing a display device to delay display of a message corresponding to the voice notification until a second time after a certain time interval elapses from the output of the voice notification at the first time, and display the message corresponding to the voice notification only after the certain time interval elapses in accordance with an instruction received from the control device.

* * * * *